United States Patent
Haga et al.

(10) Patent No.: US 8,773,344 B2
(45) Date of Patent: Jul. 8, 2014

(54) SURFACE DISPLAY DEVICE OF AN ARBITRARY SHAPE

(75) Inventors: Hiroshi Haga, Kanagawa (JP); Hideki Asada, Kanagawa (JP); Setsuo Kaneko, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 809 days.

(21) Appl. No.: 11/871,173

(22) Filed: Oct. 12, 2007

(65) Prior Publication Data

US 2008/0088568 A1    Apr. 17, 2008

(30) Foreign Application Priority Data

Oct. 13, 2006    (JP) ................... 2006-280234

(51) Int. Cl.
*G09G 3/36* (2006.01)
*G09G 3/00* (2006.01)

(52) U.S. Cl.
USPC .......................................... 345/100; 345/30

(58) Field of Classification Search
USPC .................. 345/30, 42, 92, 96, 100
See application file for complete search history.

(56) References Cited

U.S. PATENT DOCUMENTS

| | | | | |
|---|---|---|---|---|
| 3,716,723 | A * | 2/1973 | Heuner et al. | 377/105 |
| 5,095,304 | A * | 3/1992 | Young | 345/92 |
| 5,654,659 | A | 8/1997 | Asada | |
| 6,097,351 | A * | 8/2000 | Nishida | 345/1.3 |
| 6,266,038 | B1 * | 7/2001 | Yoshida et al. | 345/92 |
| 7,253,865 | B2 | 8/2007 | Battersby | |
| 7,400,306 | B2 * | 7/2008 | Hu | 345/1.3 |
| 2001/0015715 | A1 * | 8/2001 | Hebiguchi et al. | 345/92 |
| 2005/0052374 | A1 * | 3/2005 | Devos et al. | 345/82 |
| 2005/0052377 | A1 * | 3/2005 | Hsueh | 345/82 |
| 2005/0179636 | A1 * | 8/2005 | Koyama et al. | 345/100 |
| 2008/0088568 | A1 | 4/2008 | Haga et al. | |

FOREIGN PATENT DOCUMENTS

| | | |
|---|---|---|
| JP | 6-111940 | 4/1994 |
| JP | 7-239676 | 9/1995 |
| JP | 9-106264 | 4/1997 |
| JP | 10-26958 | 1/1998 |
| JP | 11-191494 | 7/1999 |
| JP | 2001-185370 | 7/2001 |
| JP | 2001-306013 | 11/2001 |
| JP | 2002-108286 | 4/2002 |
| JP | 2004-4597 | 1/2004 |
| JP | 2004-70179 | 3/2004 |

(Continued)

OTHER PUBLICATIONS

Notice of Grounds for Rejection issued Mar. 27, 2012 by the Japanese Patent Office in counterpart Japanese Patent Application No. 2006-280234, with English translation of portions encircled within wavy lines, 6 pages.

(Continued)

*Primary Examiner* — William Boddie
*Assistant Examiner* — Andrew Schnirel
(74) *Attorney, Agent, or Firm* — Young & Thompson

(57) ABSTRACT

Disclosed is a display device for use of a surface display of an arbitrary shape, including a plural number of display element units, each made up of a circuit that forms a single stage of a scanning circuit and a pixel circuit connected to an output of the scanning circuit, are arranged in a unicursal fashion on a display substrate.

17 Claims, 21 Drawing Sheets

(56) References Cited

FOREIGN PATENT DOCUMENTS

| | | |
|---|---|---|
| JP | 2004-151460 | 5/2004 |
| JP | 2005-528644 | 9/2005 |
| JP | 2006-78799 | 3/2006 |
| JP | 2008-96818 | 4/2008 |

OTHER PUBLICATIONS

Japanese Office Action dated Feb. 18, 2014 in corresponding Japanese Patent Application No. 2012-281380.

* cited by examiner

SURFACE DISPLAY DEVICE OF AN ARBITRARY SHAPE

REFERENCE TO RELATED APPLICATION

The present application is claiming the priority of the earlier Japanese patent application No. 2006-280234 filed on Oct. 13, 2006, the entire disclosure thereof being incorporated herein by reference thereto.

FIELD OF THE INVENTION

This invention relates to a display device. More particularly, this invention relates to a surface display device, such as a liquid crystal display or an EL (electroluminescence) display, being able to have a display surface shape other than a rectangular surface shape.

BACKGROUND OF THE INVENTION

In an active matrix liquid crystal display device, a plurality of pixels are arranged in rows and columns, that is, in a matrix array. Each row of the matrix of pixels shares a gate wiring connected to the gate electrodes of thin-film transistors (TFTs). Each column of the matrix of pixels shares a data wiring supplied with a data signal. The signal on the gate wiring on/off controls the thin-film transistors, such that, when the thin-film transistors are on, the signal on the data wiring is supplied to the liquid crystal material to modify the optical characteristic of the liquid crystal material.

FIG. 19 shows a typical pixel configuration in an active matrix liquid crystal device. Each row of a pixel matrix shares a common gate wiring 10, whereas each column of the pixel matrix shares a common data wiring 12. Each pixel includes a thin-film transistor 14 and a liquid crystal cell 16, arranged in series between the data wiring and a common electrode 18. The thin-film transistor 14 is turned on or off by a signal supplied to the gate wiring. Hence, the gate wiring is connected to the gate electrodes of the thin-film transistors 14 of the row associated with the pixel in question. Each pixel includes a storage capacitor 20. This storage capacitor 20 has its one end connected to the next gate wiring, previous gate wiring or to a further wiring for storage capacitor. The storage capacitor 20 stores electric charge to retain the voltage at the liquid crystal cell 16 even after the thin-film transistor 14 is turned off.

To apply desired voltage to a liquid crystal cell to acquire the needed grayscale level, a relevant signal is supplied to the data wiring in synchronization with an address signal on the gate wiring. This address signal turns on the thin-film transistor 14, thereby charging/discharging the liquid crystal cell to desired voltage and simultaneously charging/discharging the storage capacitor in keeping with the signal charge applied to the data wiring.

An address signal turns the thin-film transistor 14 off. The storage capacitor 20 retains the voltage across both ends of the liquid crystal cell 16 during addressing of other rows. The storage capacitor 20 reduces variations in the liquid crystal cell voltage due to leakage during the off-time of the thin-film transistor 14, capacitive coupling or to variations in the dielectric constant of the liquid crystal.

Each row is addressed in succession so that all rows will be addressed during one frame period.

FIG. 20 is a plan view showing the configuration of a typical active matrix liquid crystal display device. In FIG. 20, the address signal is supplied by a gate driver circuit 30, whilst the data signal is supplied to a pixel matrix 34 by a data driver circuit 32. FIG. 20 shows a rectangular active matrix liquid crystal display device.

Patent Document 1 discloses a non-rectangular display device. FIG. 21 depicts a plan view of a non-rectangular display disclosed in this Patent Document.

The display device of this Patent Document 1 includes an array of pixels, a gate driver circuit part, indicated by R, and a data driver circuit part, indicated by C. Each pixel is addressed by the gate driver circuit and the data driver circuit part, connected to a related row wiring and to a related column wiring, with the array of pixels being of a non-rectangular configuration. The display device also includes at least three of the aforementioned gate driver circuit parts and at least three of the aforementioned data driver circuit parts, arranged along the outer rim of the array. These gate driver circuit parts and data driver circuit parts are alternately arranged along the outer rim of the array of pixels. These gate driver circuit parts and data driver circuit parts may be formed on the same substrate as that on which the pixels of the display device are arranged. For example, the pixels and the driver circuit parts may be fabricated using the polysilicon process technique.

[Patent Document 1] JP Patent Kohyo Publication No. JP-P2005-528644A

SUMMARY OF THE DISCLOSURE

The entire disclosure of the above mentioned Patent Document is herein incorporated by reference thereto. The following analysis is given by the present invention.

The above-described conventional display device has the following problems.

The first problem is that the conventional display device cannot afford an arbitrary shape. That is, the conventional technique allows fabrication of display devices of only a limited range of the non-rectangular shape, but suffers from a highly limited degree of freedom of shape designing.

One of the reasons is that the driver circuit units are arranged for extending along the outer periphery of the matrix of pixels. The conventional technique is in need of a transversely extending gate wiring and a vertically extending data wiring in order to address a pixel. The gate wiring and the data wiring are provided for extending from each pixel up to the outer periphery of the pixel matrix. Since it is necessary to prevent the gate and data wirings from being interrupted, there are placed limitations on the degree of freedom in the shape of the display device. Depending on the shape of the display device, there is raised a problem that the wirings are partially interrupted such that there may be a non-addressable pixel area in the display device.

Another reason the display device of the conventional technique cannot cope with an arbitrary shape is that a driver circuit of a TAB (Tape Automated Bonding) configuration is connected to the outer rim of the pixel matrix part. The TAB is handled in the configuration of a film-shaped TCP (Tape Support Package). Before being severed into individual TAB pieces, the TAB is wrapped as a coil around a drum like a motion picture film.

Hence, the as-severed TAB is flat and is usually connected to a liquid crystal panel using an anisotropic electrically conductive film on a liquid crystal panel before being bent.

If, after connecting the TAB to a liquid crystal panel having a curvilinear outer profile, the TAB is to be bent in the heart shape as a design feature, as shown in FIG. 21, this bending represents a difficult operation.

The reason is that the TAB bend is usually rectilinear in shape.

This problem is felt more keenly as the radius of curvature of the outer profile becomes smaller. In addition, if there are a plural number of crests and recesses in a sole TAB connection, it is extremely difficult to bend the TAB along this shape to provide the design feature.

The second problem is that mask designing is extremely time-consuming if the driver circuit unit is to be formed along the curvilinear shape of the outer profile with the use of the polysilicon process technique.

Like the layout of a pixel matrix part, the layout of the driver circuit of the display device is drawn by arranging a plural number of unit cells in the form of an array.

In the case of a gate driver circuit, a unit cell, made up of a circuit constituting a single stage of a scanning circuit, a circuit for buffering an output of the single stage of the scanning circuit and a circuit for enabling an output of the single stage, is prepared. The pitch and the number of the unit cells are specified on CAD (Computer Aided Design), whereby the cells are arrayed on a straight line to enable a desired circuit layout to be obtained in a short time.

Although the current CAD for circuit layout has the function of linearly arraying the unit cells in the X- and Y-directions, it does not have the function of arraying the unit cells along a curve.

That is, to prepare a layout of driver circuit units along the outer rim of a display device, it is necessary to arrange the unit cells one by one by a manual operation, or to prepare a number of arrays, each made up of several unit cells, and to arrange the so prepared arrays, again by a manual operation. Hence, the mask designing is an extremely time-consuming operation and a mask designer has to go home as he/she has been fatigued with the laborious operation.

It is therefore an object of the present invention to enhance the degree of freedom in designing the shape of a display device and to provide a display device of an arbitrary shape.

It is another object of the present invention to achieve shorter designing time for a display device of an arbitrary shape and to provide a display device having improved productivity.

It is a further object of the present invention to provide a display device whereby it is possible to narrow down the frame width/length of the display device as the above objects are fulfilled.

It is a further object of the present invention to provide a display device whereby it is possible to reduce the number of connection terminals of a substrate of a display device as the above objects are fulfilled.

It is yet another object of the present invention to provide a display device whereby it is possible to elevate the aperture ratio of pixels as the above objects are fulfilled.

The present invention has substantially the following configuration. Meanwhile, in the following description, the reference numerals in the drawing are appended in parentheses to specify the components. This, however, is intended to help comprehend the present invention and should not be interpreted to restrict the scope of the invention.

In one aspect, the present invention provides a surface display device comprising a plurality of display element units arranged with one stroke on a display substrate. Each of the display element units includes a circuit constituting a single stage of a scanning circuit (also termed a 'unit circuit' of the scanning circuit) (206 of FIG. 2) and a pixel circuit (202) connected to an output node (n2 of FIG. 2) of the unit circuit. That is, a plurality of display element units (200), each composed of a circuit (206 of FIG. 2), forming a single stage of the scanning circuit, and a pixel circuit (202), connected to an output node (n2 of FIG. 2) of the circuit (206 of FIG. 2), are arrayed in succession on a display substrate (208 of FIG. 1).

The scanning circuit is preferably driven by a clock signal which is a single-phase clock signal.

In another aspect (claim 3), the present invention provides a surface display device comprising a scanning circuit (204) including a transistor (214(a), 214(b), 214(c), ... of FIG. 13) for outputting the scanning signal to the output node of the scanning circuit and a pixel circuit (202) connected to the output node, wherein the transistor outputting the scanning signal to the output node and the sole pixel circuit are arranged as a set and a plurality of the sets of the transistors and the pixel circuits are arrayed together to form substantially the entire area of a display area.

In a further aspect (claim 4), the present invention provides a surface display device comprising a scanning circuit (204) including a transistor (214(a), 214(b), 214(c), 214(d) ... of FIG. 13) for outputting the scanning signal to the output node of the scanning circuit, and a pixel circuit (202) connected to the output node, wherein the transistor outputting the scanning signal to the output node and the sole pixel circuit are arranged as a set and a plurality of the sets of the transistors and the pixel circuits are arrayed together on the surface display device to constitute the display area. The transistors used in the scanning circuit and in the pixel circuits are polysilicon TFTs formed on a glass substrate.

In a further aspect (claim 5), the present invention provides a surface display device comprising the scanning circuit arranged with one stroke or unicursally on a non-rectangular display substrate and a pixel circuit connected to each output stage of the scanning circuit. The scanning circuit is arranged on the display substrate (208) as it presents at least one folded part (52), whereby the non-rectangular display area is formed.

In a further aspect of the present invention (claim 6), the present invention provides a surface display device comprising the scanning circuit arranged with one stroke or unicursally on the display substrate and a pixel circuit connected to each output stage of the scanning circuit. The scanning circuit is arranged spirally on the display substrate to render it possible to form a non-rectangular display area (FIG. 5).

In a further aspect (claim 7), the present invention provides a surface display device comprising a plurality of pixel circuits (202) and a scanning circuit (204) for sequentially applying a voltage to the pixel circuits. A part of the scanning circuit is arranged between neighboring ones of the pixel circuits or underneath the pixel circuit.

In a further aspect (claim 8), the present invention provides a surface display device wherein a circuit including a plurality of pixel circuits (202) and a scanning circuit (204) for sequentially applying the voltage to the pixel circuits is arranged on a display substrate so as to have at least one bend (FIG. 1).

In a further aspect (claim 9), the present invention provides a surface display device wherein a spiral array of a plurality of pixel circuits (202) and a scanning circuit (204) for sequentially applying the voltage to the pixel circuits is spirally arranged on a display substrate (FIG. 5).

In a further aspect (claim 10), the present invention provides a surface display device wherein a flexible linear display unit (302) made up of a scanning circuit and a plurality of pixel circuits that may be selected by the scanning circuit is wrapped at least two turns on a support (304) (FIGS. 7A to 7B).

In a further aspect (claim 14), the present invention provides a display device in which a transistor constituting a pixel switch (350) has a gate electrode connected to an output node of a scanning circuit, wherein output nodes (n1, n3, n5, . . . of FIG. 13) of odd stage unit circuits of the scanning circuit output a scanning signal of a first polarity (active-low), and output nodes of even stage unit circuits (n2, n4, n6, . . . of FIG. 13) of the scanning circuit output a scanning signal of a polarity opposite to the first polarity. The pixel switches connected to the output nodes of odd stage unit circuits of the scanning circuit are each a transistor of a first conductivity type (p-type), whereas the pixel switches connected to the output nodes of even stage unit circuits of the scanning circuit are each a transistor of a second conductivity type (n-type).

In a further aspect (claim 15), the present invention provides a display device wherein the odd stage unit circuits of the scanning circuit each include an inverter circuit (54 of FIG. 13) receiving a pulse signal from a previous stage, and switching transistors (214a, 214c of FIG. 13) of a second conductivity type (n-type) connected between an output node of the inverter circuit and an output node of the scanning circuit. The even stage unit circuits of the scanning circuit each include an inverter circuit receiving a pulse signal from a previous stage and switching transistors (214b, 214d of FIG. 13) of a first conductivity type (p-type) connected between the output node of the inverter circuit and the output node of the scanning circuit. A common clock signal is applied to each of the gate electrodes of the switching transistors.

In a further aspect (claim 16), the present invention provides a display device wherein the odd stage unit circuits and the even stage unit circuits of the scanning circuit each include a clocked inverter (56 of FIG. 15A) receiving a pulse signal supplied from a previous stage. The output node of the clocked inverter is an output node of the scanning circuit. A clock signal is supplied to the gate electrode of the transistor of the second conductivity type (n-type) of the clocked inverter in the odd stage unit circuit of the scanning circuit. A signal obtained by inverting the clock signal is supplied to the gate electrode of the transistor of the first conductivity type (p-type) of the clocked inverter. A signal obtained by inverting the clock signal is supplied to the gate electrode of the transistor of the second conductivity type (n-type) of the clocked inverter in the even stage unit circuit of the scanning circuit. The clock signal is supplied to the gate electrode of the transistor of the first conductivity type (p-type) of the clocked inverter (FIGS. 15A and 15B).

In a further aspect (claim 17), the present invention provides a display device wherein each of the odd stage unit circuits and each of the even stage unit circuits of the scanning circuit each include an inverter circuit (54 of FIG. 15B) receiving a pulse signal from a previous stage, and a CMOS transmission gate (58) connected between an output node of the inverter circuit and an output node of the unit circuit. A clock signal is supplied to a gate electrode of a transistor of a second conductivity type (n-type) of the CMOS transmission gate in the odd stage unit circuit of the scanning circuit. A signal obtained by inverting the clock signal is supplied to the gate electrode of the transistor of the first conductivity type (p-type) of the CMOS transmission gate. The signal obtained by inverting the clock signal is supplied to the gate electrode of the transistor of the second conductivity type (n-type) of the CMOS transmission gate in the even stage unit circuit of the scanning circuit. The clock signal is supplied to the gate electrode of the transistor of the first conductivity type (p-type) of the CMOS transmission gate.

In a further aspect (claim 18), the present invention provides a display device wherein each of the even stage unit circuits and each the odd stage unit circuits of the scanning circuit each include a single-phase clock controlled inverter (60) comprising:

first to fourth switch devices (M01 to M04 of FIG. 17B), sequentially connected in series between a high potential side power supply and a low potential side power supply; wherein said first and second switch devices are each a p-type MOS transistor; and said third and fourth switch devices are each an n-type MOS transistor;

gate electrodes of one of said p-type MOS transistors (M02) and one of said n-type MOS transistors (M03) being connected in common and receiving a pulse signal supplied from a previous stage; while a clock signal is supplied to the gates of the remaining two MOS transistors (M01, M04);

drain electrodes of said one of said p-type MOS transistors (M02) and said one of said n-type MOS transistors (M03) being connected in common to constitute the output node of the unit circuit.

The meritorious effects of the present invention are summarized as follows.

The first meritorious effect of the present invention is that a display device of an arbitrary shape may be implemented.

One of the reasons is that a plural number of display element units, each composed of a circuit forming a single stage of the scanning circuit, and a pixel circuit, connected to an output node of the scanning circuit, are connected in cascade so that all pixels will be addressed sequentially. The resulting circuit is arranged in a unicursal fashion on a display substrate to form a display area. That is, the unicursally arranged array may optionally be laid out to form a display area of an arbitrary shape.

Another reason is that, since the display element units are arrayed with one stroke or unicursally on the display substrate to form a display area, it is possible to address all pixels in the display area. In a conventional display device, the pixels arranged at the points of intersection of data wirings linearly arranged in the vertical direction and gate wirings linearly arranged in the horizontal direction are addressed. Thus, depending on the shape of the display device, there is raised a problem that certain pixel areas may be non-addressable due to wiring disconnection.

Still another reason is that, since the display area of the display substrate is constituted by unicursally arranged display element units, it is sufficient that a connection part between the display substrate and the circuit for driving the display substrate is located at an end of the unicursally arranged display element units. Hence, the number of the connection terminals for connection with the circuit driving the display substrate may be reduced, so that there is no necessity of providing the drivers of the TAB type on the outer rim of the display area, or the number of the drivers may be reduced. The bend parts of the TAB are usually linear so that it has been extremely difficult to provide a curved shape of the outer rim of the display substrate.

The second meritorious effect of the present invention is that mask designing time may be reduced.

The reason is that there is no necessity of laying out the driver circuit along the curved outer shape of the outer rim. In implementing the present invention, a number of sets of laid-out display element units, with each set being a unit cell, are arrayed along the transverse width of the display area to complete a layout for each row. This process is the same as that of arraying one row of pixels in the conventional process. Heretofore, the driver circuits need to be laid out non-linearly along the outer rim. This operation may be dispensed with and hence the mask designing time may be reduced.

The third meritorious effect of the present invention is that the frame width of the display device may be decreased.

The reason is that there is no necessity of providing the driver circuit along the outer rim of the display substrate. That is, the display element units may be arranged up to the outer rim of the display substrate so that the shape of the display substrate will be coincident with the shape of the display area, as a result of which the frame width/length of the display device may be decreased.

The fourth meritorious effect of the present invention is that the number of connection terminals of the display substrate may be reduced.

The reason is that, since the display area on the display substrate is constituted by the unicursally arranged display element units, the sites of connection between the display substrate and the circuit for driving the substrate is located at one end of the unicursally arranged display element units.

The fifth meritorious effect of the present invention is that the aperture ratio of the pixels may be increased.

The reason is that the number of the transistors that make up the scanning circuit and the number of the clock signals driving the scanning circuit are only small.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

PREFERRED MODES OF THE INVENTION

With reference to the accompanying drawings, preferred examples of the present invention will be described in detail.

Example 1

Figure 1:
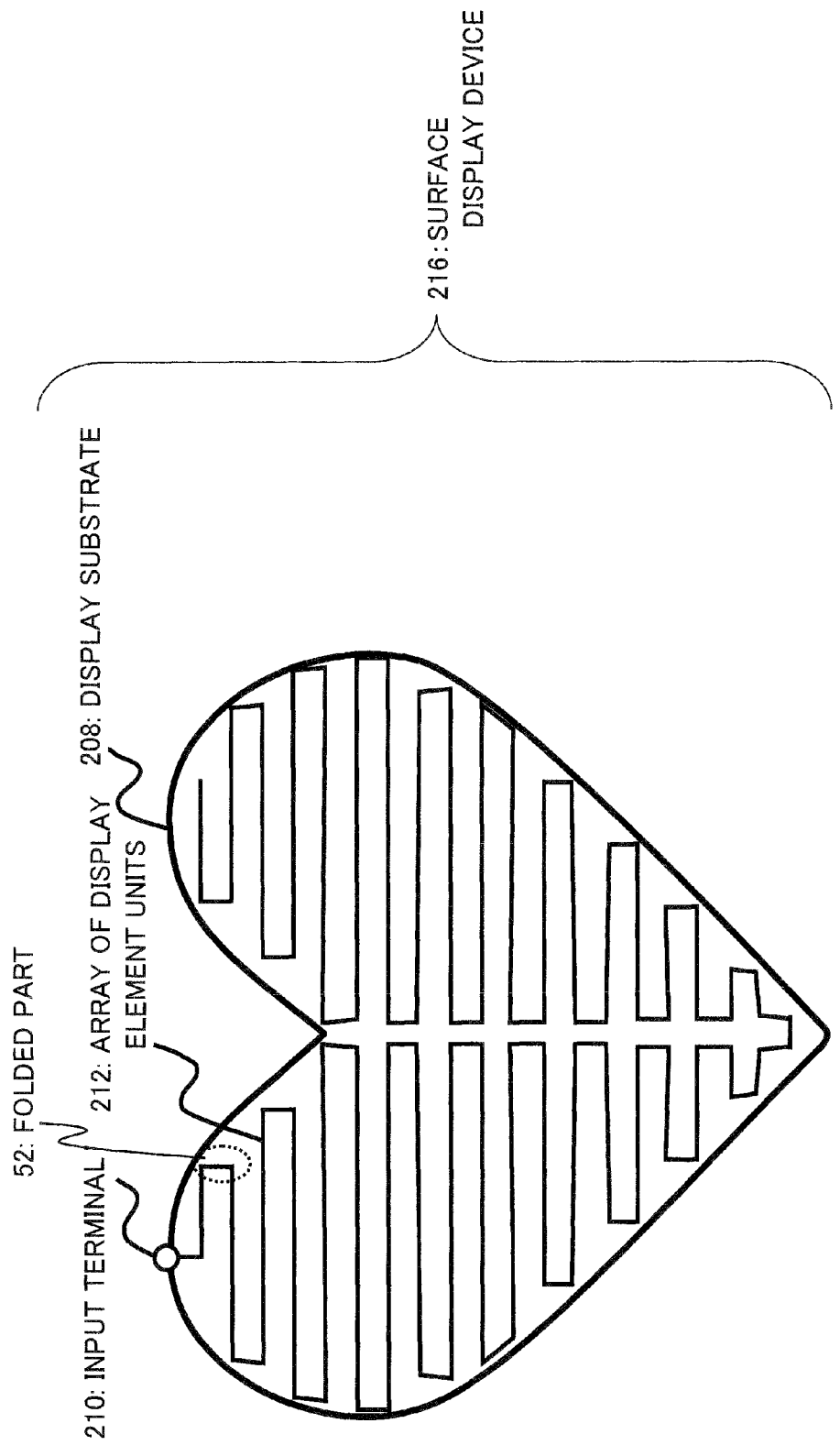
FIG. 1 is plan view showing a surface display device of an example of the present invention.

FIG. 1 shows the configuration of an active matrix liquid crystal display device as an example of the present invention. In the example shown in FIG. 1, a large number of display element units are arranged with one stroke or unicursally within a display area substantially coincident with the shape of a display substrate (208) to constitute a surface display device. That is, the display element units are arranged with one stroke or unicursally as they are bent at more than one site to conform to the shape of the display area to constitute a surface display device.

The display element units and an array of the display element units are now described with reference to FIG. 2. By the array of the display element units is meant an array of the display element units on the display substrate.

Figure 2:
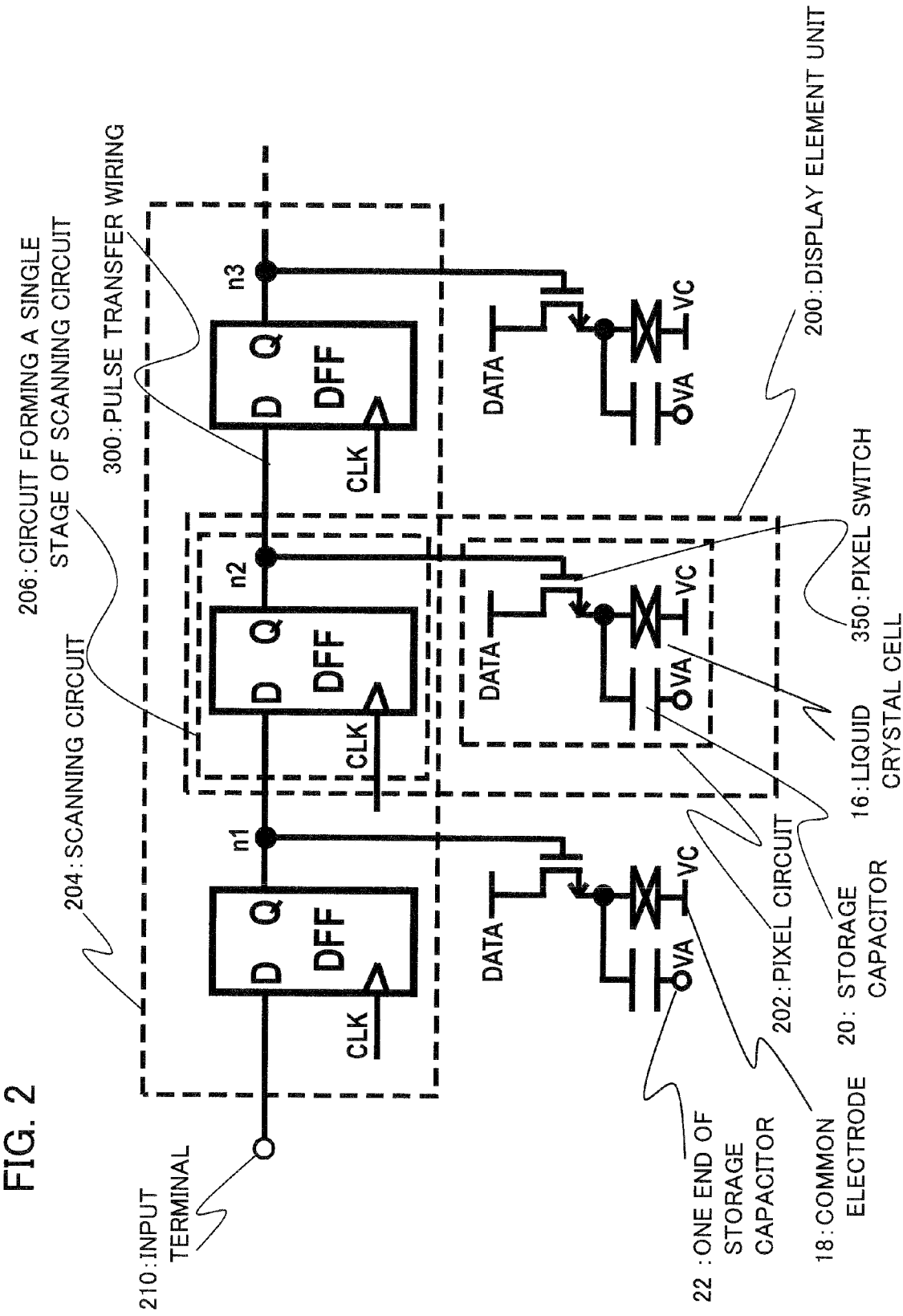
FIG. 2 is a circuit diagram showing the surface display device of an example of the present invention.

Referring to FIG. 2, the display element unit (200) is made up of a circuit (206) that forms a stage of a scanning circuit, also termed a 'unit circuit' of the scanning circuit, and a pixel circuit (202) connected to an output node of the circuit (206).

More specifically, the circuit (206), forming a stage of the scanning circuit, is e.g., a D-type flip-flop, abbreviated to DFF, and a pixel circuit is connected to an output node Q of the DFF. The DFF samples an input signal supplied to an input node D to output a sampled signal at an output node Q in synchronization with rise of a clock signal supplied to a CLK node.

The pixel circuit (202) includes: a pixel switch (350), the drain terminal of which is connected to a DATA node; a liquid crystal cell (16) connected between a source terminal of the pixel switch (350); and a common electrode VC (18), and a storage capacitor (20).

The storage capacitor (20) has one end connected to a node of the liquid crystal cell (16) opposite to the common electrode VC (18). The opposite end VA (22) of the storage capacitor (20) is connected to a wiring of the storage capacitor or to a wiring at a preset potential, such as power supply wiring of the DFF.

By the unicursal array of the display element units (212 of FIG. 1) is meant a circuit composed of cascaded connection of display element units in which output nodes Q of the DFFs of the display element units are connected to input nodes D of the next-stage DFFs.

Meanwhile, a circuit composed of a plural number of the cascaded connections, in which the output nodes of the DFFs of the display element units are connected to the input nodes D of the next-stage DFFs, is termed a 'scanning circuit' or a 'shift register circuit'.

By a wiring that connects the output node Q of the DFF and the input node D of the next stage DFF, a pulse signal is transferred to the downstream side stage in synchronism with the clock signal. The wiring that connects the output node Q of the DFF and the input node D is termed a 'pulse transfer wiring' (300).

Figure 3:
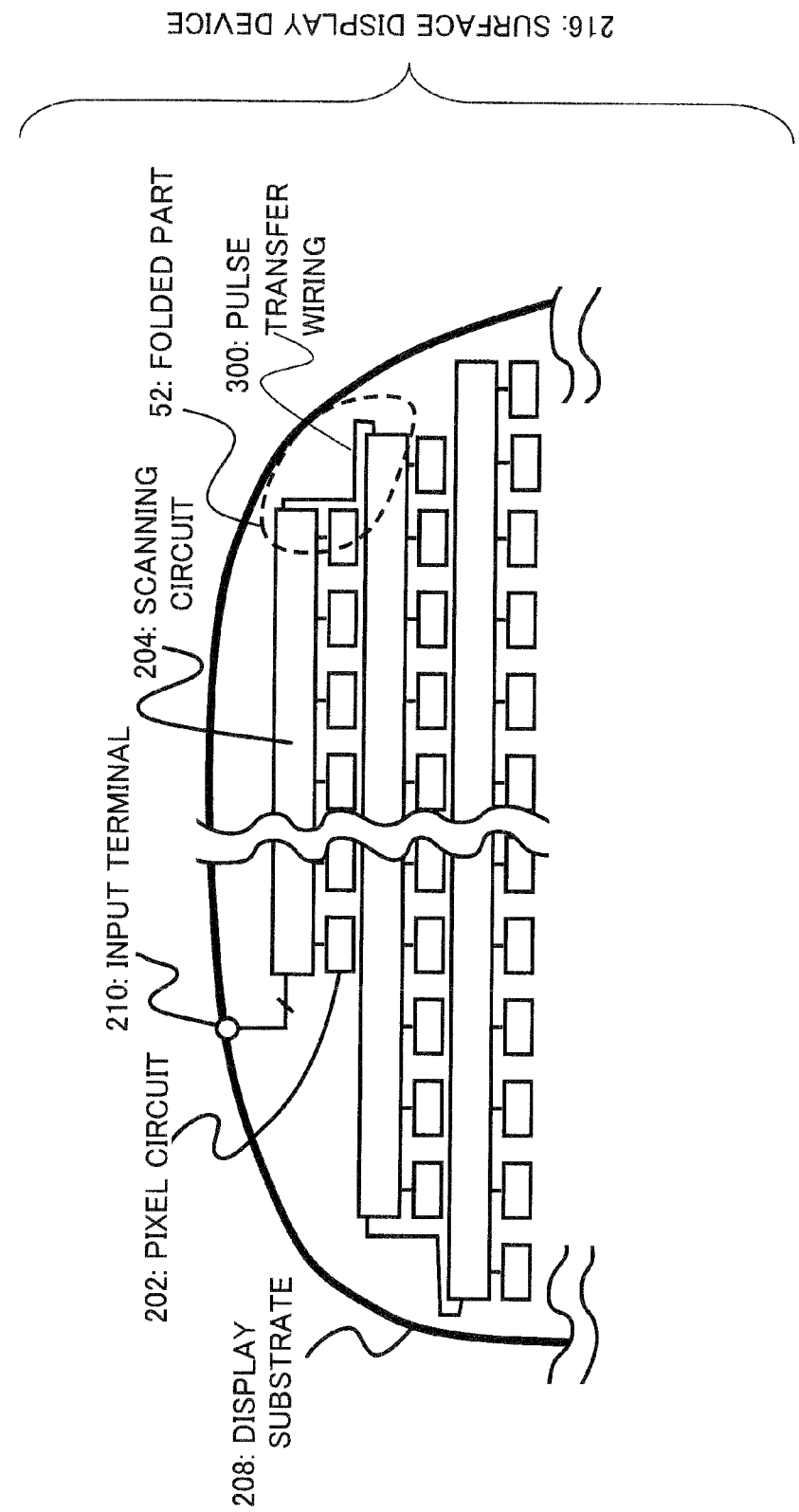
FIG. 3 is a plan view showing another surface display device of an example of the present invention.

The scanning circuit and the pixel circuit are laid out on the display substrate, using e.g., the polysilicon process technique, as shown in FIG. 3.

The scanning circuit (204) and the pixel circuits (202), which are connected to the output node of the scanning circuit, are formed on the display substrate, as shown in FIG. 3. The scanning circuit (204) and the pixel circuits (202), connected to the output nodes of the scanning circuit, make up a single row. A plural number of these rows make up a display area.

The pulse transfer wiring (300) is arranged to connect two neighboring rows. The connect portion is a folded part of the scanning circuit, laid out with one stroke or in a unicursal fashion, and is labeled a folded part (52) in FIG. 3.

A signal is supplied at an input terminal (210) provided at an end of the scanning circuit.

The scanning circuit is laid out so that the pitch of pixels, formed by the pixel circuit, is constant in both the vertical and horizontal directions.

By so doing, it is possible to avoid the feared problem of unneeded lines produced on a display part to detract appreciably from the picture quality.

By adjusting the number of display element units that make up a row, adjusting the transverse length of each row in keeping with the display area, and by laying out plural rows, to fill up the display area, it is possible to realize a display device of an optional outer shape.

Since the pulse transfer wiring (300) is arranged between neighboring rows, the scanning circuits in the respective rows may be arranged in the entire display area with one stroke or in a unicursal fashion, and the respective pixels are addressed in a unicursal fashion.

The operation of the present example is now described.

To apply a desired voltage to the respective liquid crystal cells to obtain the desired grayscale level, a proper signal is supplied to a data wiring connected to the DATA node in synchronization with an output of the scanning circuit (204). An output signal of the scanning circuit turns on the pixel switch (350). This charges/discharges the liquid crystal cell (16) to a desired voltage, responsive to a signal voltage applied to the data wiring, while simultaneously charging/discharging the storage capacitor 20.

The pixel switch (350) is then turned off by the output signal of the scanning circuit. The voltage written in the liquid crystal cell (16) is maintained during addressing of the other pixel.

The scanning circuit outputs scanning signals in succession so that all pixels will be addressed in one frame period.

With the present example, the display element units (200) are arranged in a display area of the display device, in a unicursal fashion, so that it is possible to cope with display devices of optional shapes. This will become clear by referring to other examples which will be described subsequently.

If, in the conventional display device, the pixels are to be addressed, it is necessary to provide gate wirings transversely extending to the outer rim of the display substrate and data wirings vertically extending to the outer rim of the display substrate, thus imposing restrictions on the degree of freedom in shape designing.

With the present example, the display area on the display substrate is made up of the display element units arranged in a unicursal fashion. It is therefore sufficient that the connection part between the display substrate and the circuitry for driving the display substrate is at an end of the display element units, arranged in a unicursal fashion. Hence, there may be derived a meritorious effect that the number of connection terminals between the display substrate and the circuitry for driving it may be reduced.

Thus, even though the substrate is flexible, due to use of the TAB for connection, the sites of connection are limited to only a part of the outer rim of the display substrate. Hence, the design effect that the shape of the display area itself may be the shape of the display device may be achieved.

With the present example, the display area on the display substrate is constituted by the display element units, arranged in the unicursal fashion, while it is sufficient that the connection part of the display substrate for connection with the circuitry that drives the substrate is at one end of the unicursally arranged display element units. Thus, if the display area is of a pinched-in shape, such as gourd-shaped, and the pinched-in area is of an extremely narrow width, so that it is possible to realize such shape of the display device, provided that the display area is of a width sufficient to accommodate the display element units. Stated differently, it is possible to cope with optional shapes of the display devices.

With the present example, it is unnecessary to lay out the driver circuit units along the curved outer rim, thus shortening the mask designing time.

In the present example, the display element unit is laid out to constitute a unit cell, and a number of the unit cells, corresponding to the transverse width of the display area, are arrayed in a line to complete the layout for one row. This process is the same as the conventional layout process for one row. Hitherto, the driver circuit units need to be laid out non-linearly for extending along the outer rim. With the present example, this non-linear layout of the driver circuit units along the outer rim may be dispensed with, thus enabling the mask designing time to be reduced.

Meanwhile, if part or all of the display area is rectangular-shaped, row-based layout is not mandatory. In such case, the display area layout may be realized by arraying unit cells in a matrix and by adding or deleting a unit cell or unit cells as necessary.

With the present example, the effect of narrowing down the frame width/length of the display device may be derived. It is assumed in the following that the driver circuit units of the display device are formed on the display substrate, using the polysilicon process technique, for instance.

Figure 21:
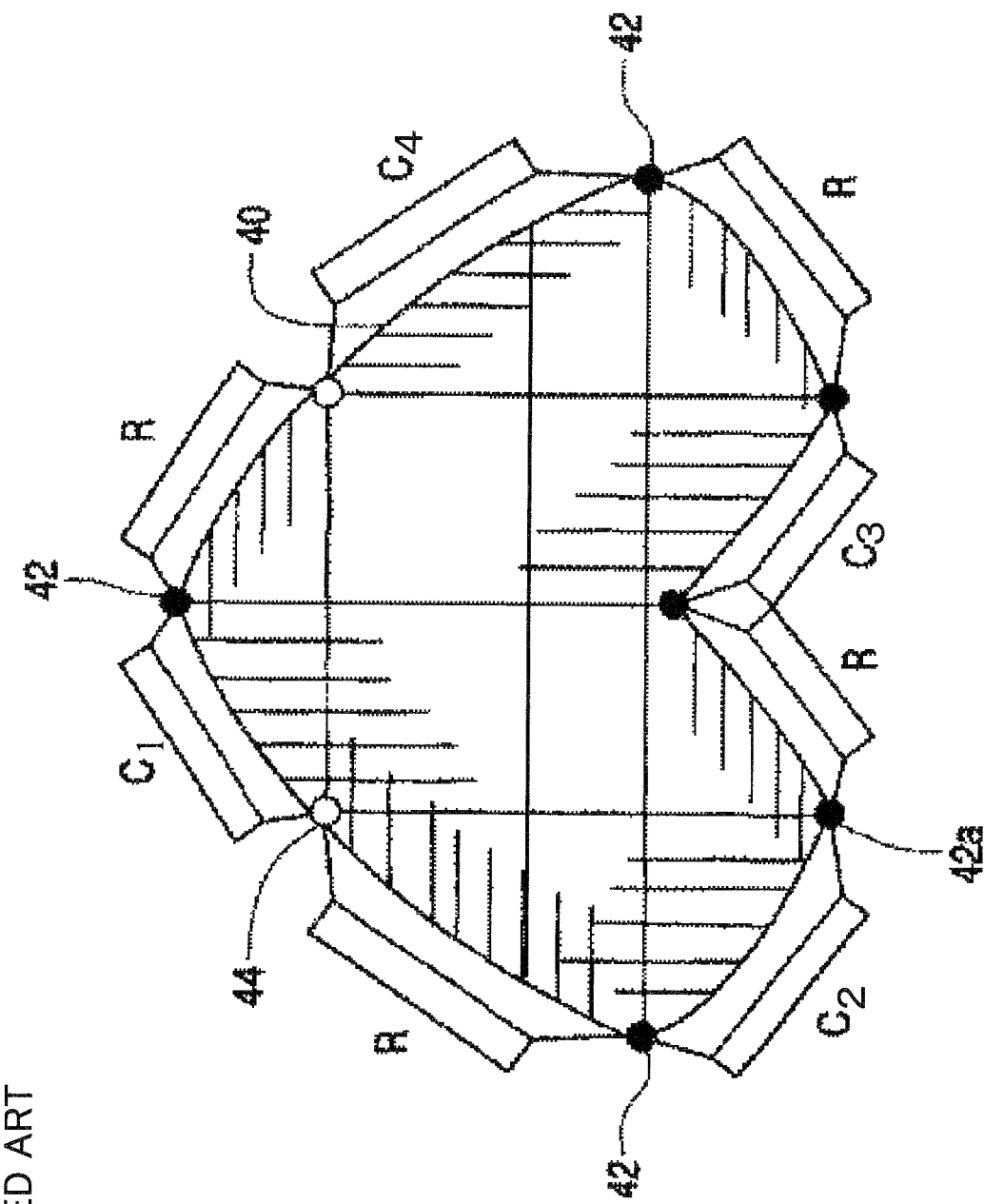
FIG. 21 is a plan view showing a non-rectangular display device disclosed in the patent document 1.

In case the driver circuit units of the display device of the related art, shown in FIG. 21, are formed on the display substrate, those driver circuit units are laid out along the outer rim of the display substrate. Hence, the display area is on an inner side of the edge of the outer rim of the display substrate, and on an inner side of the layout area of the driver circuit units arranged on the inner side of the outer rim edge.

Conversely, with the present example, it is unnecessary to lay out the driver circuit units along the outer rim of the display substrate. It is therefore possible to arrange the display area to the very edge of the display substrate.

Meanwhile, the driver circuit unit of the related art has to drive a number of transistors equal to the number of transversely arranged pixels and the parasitic capacitance of the transversely extending gate wirings. Hence, a buffer circuit composed of a large size transistor is needed for the gate driver.

Conversely, with the present example, only one transistor (pixel switch) is connected to the output node of the circuit (206) that constitutes each stage of the scanning circuit. Moreover, the wiring connected to this output node is of shorter length and has only small parasitic capacitance, and hence there is no necessity of providing a buffer circuit constituted by a transistor of a larger size.

Example 2

In the above-described example 1, the display element units are arranged in the entire display area in a unicursal fashion, as described above with reference to FIG. 1.

Figure 4:
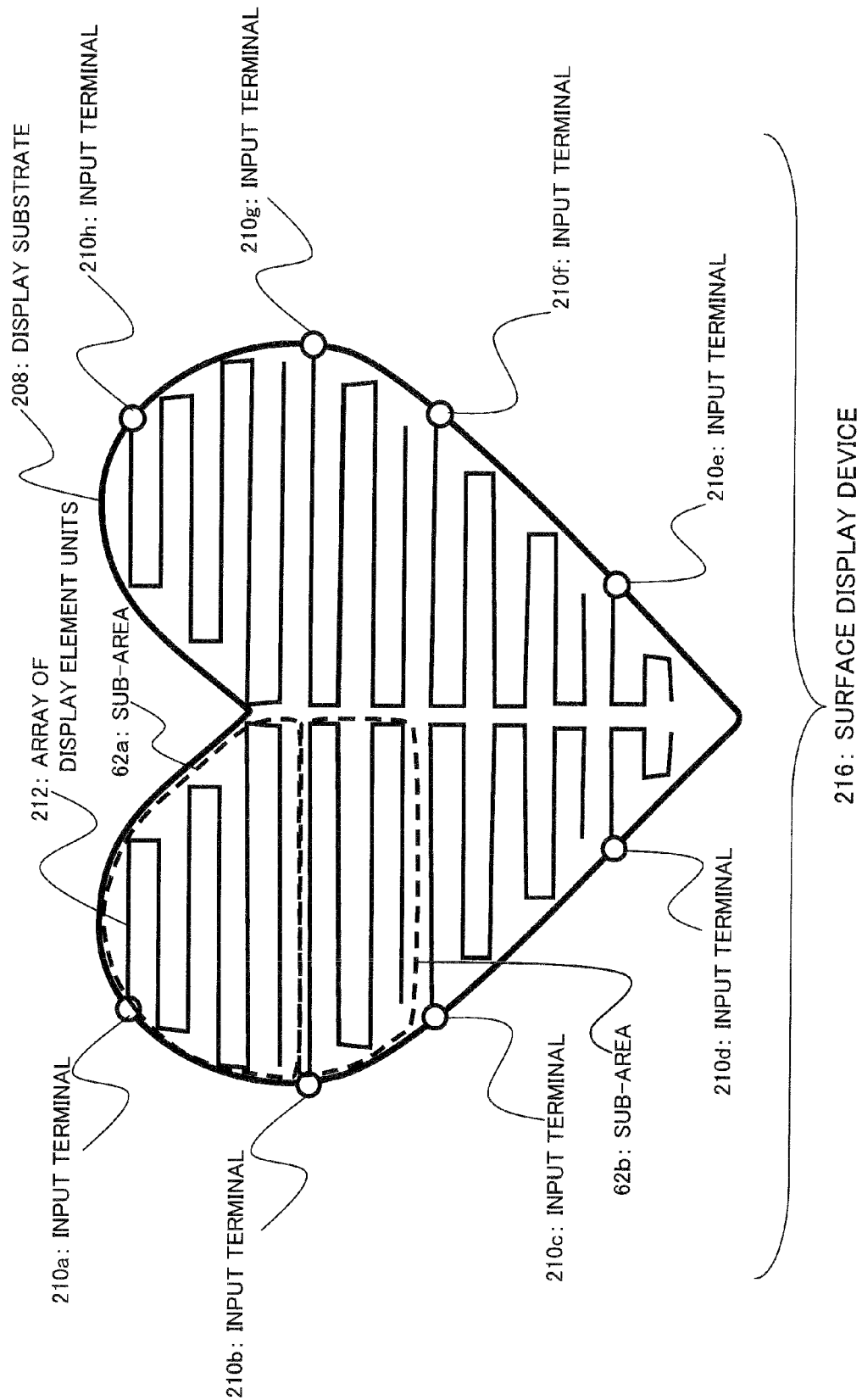
FIG. 4 is a plan view showing still another surface display device of an example of the present invention.
Figure 5:
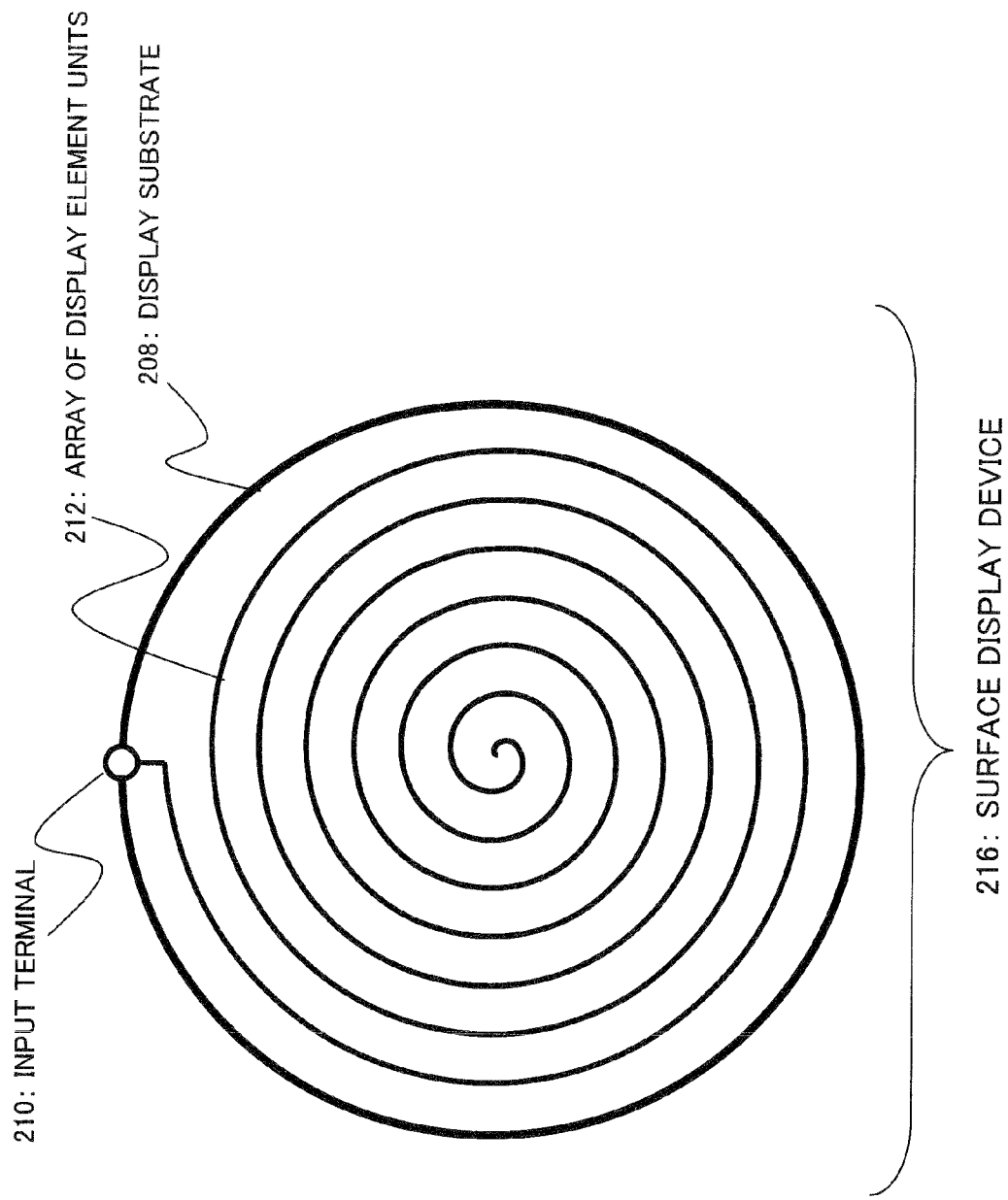
FIG. 5 is a plan view showing still another surface display device of an example of the present invention.

In an example 2, shown in FIG. 4, the display area is divided in plural sub-areas, in each of which the display element units are arranged in a unicursal fashion.

In FIG. 4, there are eight sub-areas, of which only two are labeled 62*a* and 62*b*.

In the present example, in which the display area is divided into plural sub-areas, it is possible to reduce the clock frequency afforded to the scanning circuit and the load capacitance of the clock signal wiring, resulting in the decreased clock delay.

Further, the load capacitance of the data wiring is decreased, resulting in the reduced delay of the data signal.

Thus, a display device of a larger size or a display device with a larger number of pixels may be driven more easily than with the example 1.

In FIG. 4, input terminals (210*a*~210*h*) are provided in the respective sub-areas. Alternatively, a wiring may be provided on the display substrate and the input terminals may be assembled together in one area. By so doing, the electrical connection to outside may be made by packaging the flexible substrate in one location. This is desirable for fabrication of a display device of an arbitrary shape.

Example 3

In the above-described example 1, a plural number of rows, each including a linear array of display element units, are arrayed side by side to constitute a display device, as described with reference to FIGS. 1 and 3. In an example 3 of the present invention, display element units are arranged spirally to constitute a surface display device.

Example 4

Figure 6:
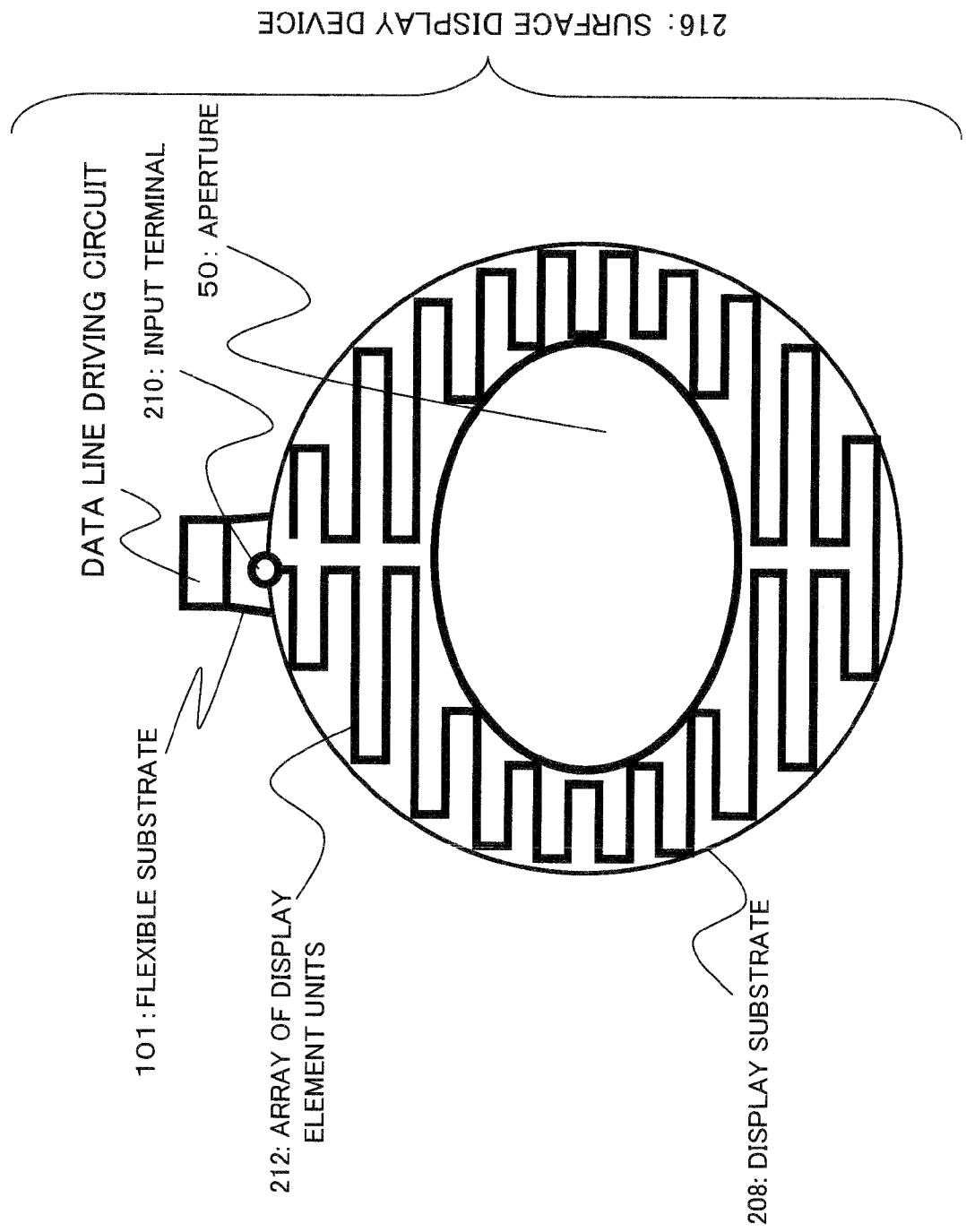
FIG. 6 is a plan view showing still another surface display device according to the present invention.

FIG. 6 shows the configuration of an example 4 of the present invention. The present example 4 refers to a surface display device, a display substrate of which includes an aperture 50. With this shape of the display device, the display area may be filled up with the unicursally arranged display electrical element units. The degree of designing freedom with respect to the shape of the surface display device is high. Moreover, since there is no necessity of providing driver circuit units along the rim of the aperture formed in the display substrate, the degree of freedom of the outer shape of the display device is also high.

This shape of the display device is difficult to implement with the related art for the following reasons.

One of the reasons is that, since there is provided the aperture, the data wiring or the gate wiring is interrupted, such that there may be an area in which the wiring cannot be connected, or cannot be connected with ease, to the gate driver circuit or the data driver circuit arranged on the outer rim of the pixel matrix.

As a solution to this problem, it may be contemplated to additionally provide a data driver circuit or a gate driver circuit along the edge of the aperture.

An example of the method for providing the data driver circuit or the gate driver circuit is packaging by TAB. A set of terminals on the output side of the TAB is connected to a data line of a liquid crystal panel or to an input terminal of a gate line using an anisotropic electrically conductive film.

If the shape of the aperture is to be a design feature, and such effect is desired, the TAB needs to be folded to the back side of the display device.

However, the aperture usually has a small radius of curvature, so that it is difficult to fold back the TAB this way.

Further, designing restrictions, such as increased number of component parts or increased cost, are newly presented, such as providing additional wirings to be connected to the set of terminals on the TAB input side on the back surface of the display device.

Among other packaging methods, there is a method of forming a data driver circuit or a gate driver circuit along the edge of the outer rim or the aperture, using the polysilicon process technique. A connection terminal for signal input may be provided on a part of the edge of the outer rim.

However, in this case, it is necessary to provide a wiring to apply an input signal to the driver circuit unit along the edge of the aperture.

If the polysilicon process technique is used, this wiring is formed on the same surface as the surface carrying the pixel transistor. In this case, there may be produced such an area in which the layout of the pixel matrix part is out of order.

The result is that unneeded lines tend to be produced on a pixel matrix part, that is, on a display area, to detract appreciably from the image quality.

For these reasons, it is difficult to achieve the shape having the aperture shown in FIG. 6. This problem has now been overcome in accordance with the present invention.

Figure 7:
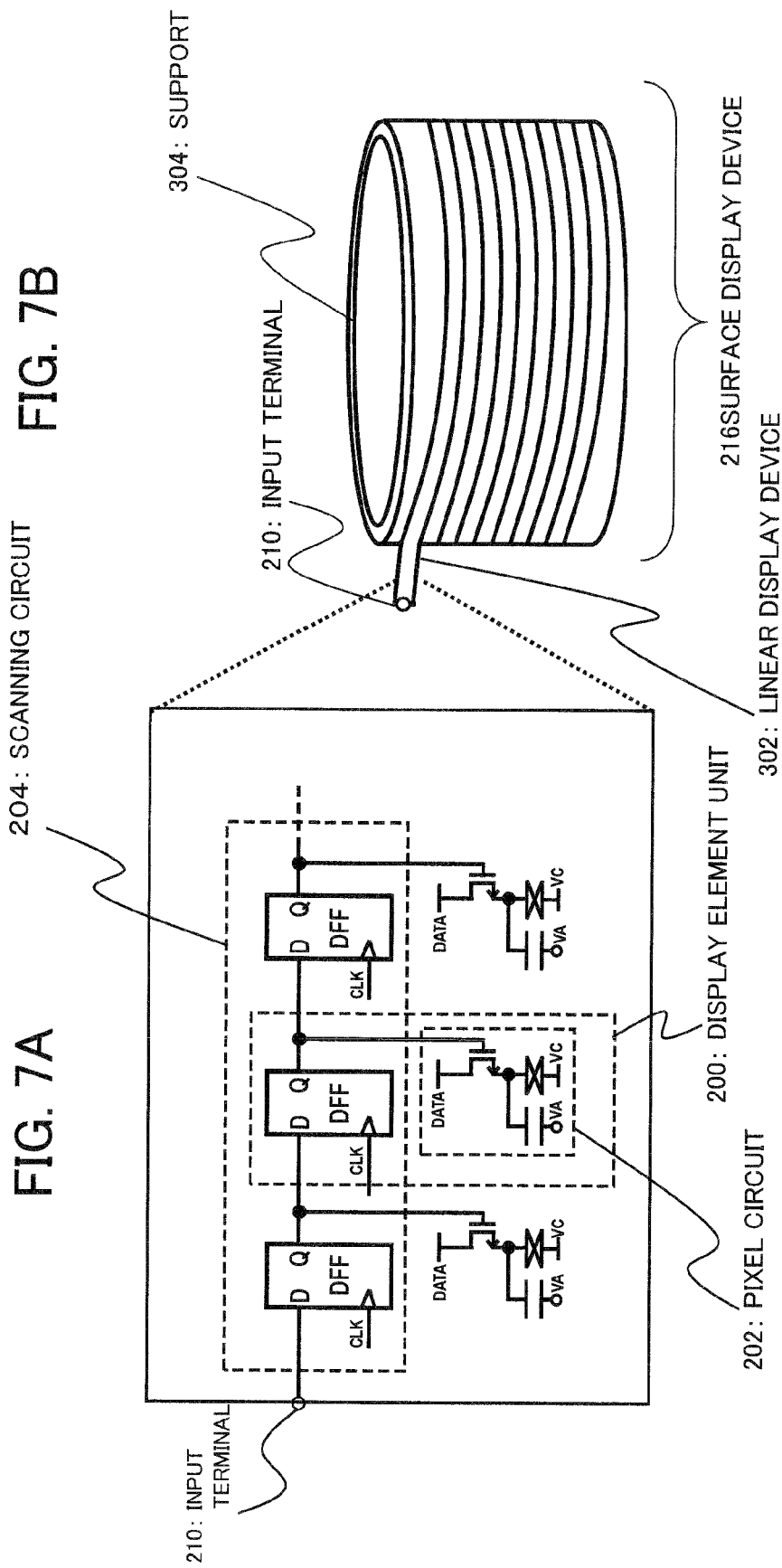
FIGS. 7A and 7B are a perspective view and a circuit diagram of a further surface display device of an example of the present invention, respectively.

FIGS. 7A and 7B show the configuration of an example 5 of the present invention. Referring to FIGS. 7A and 7B, the present example will now be described. In the present example, a scanning circuit (204) and a pixel circuit (202), which is connected to each output node of the scanning circuit (204), are formed on an elongated flexible substrate. This elongated display device, that is, a line-shaped display device (302), is wrapped around a support (304) to provide a surface display device.

With the present example, the display area of the display device is constituted by unicursally arranged display element units (200). It is therefore sufficient if the connection part between the display device and the circuitry for driving the display device is located at an end of the unicursally arranged display element units, with the result that the number of connection terminals between the display device and the circuitry for driving the display device may be reduced.

Other Examples

In the above-described examples, an example of an active matrix liquid crystal display device is shown. However, the configuration of the display device is not limited to this example. For example, the display device may be a surface display device constituted by pixels, such as an EL (Electroluminescence) display device, electronic paper or an electrical field emission type display device, for which case the multiple favorable effects such as stated in the above examples may be derived.

In the above-described examples, such a configuration in which display element units are formed on a display substrate using the polysilicon process technique is shown as the configuration of forming the display element units on a display substrate. The present invention may, of course, not be limited to this fabrication method. For example, the amorphous silicon process technique or a variety of organic semiwiring process techniques may be used for forming the display element units. Or, a single crystal silicon thin film may be formed on an insulating substrate and the film so formed may then be used to form the display element units.

In addition to the configuration of forming the display element units using a thin film process on the insulating substrate, the display element units may also be formed on a silicon substrate.

In the above-described examples, the scanning circuit and the pixels connected thereto, are laid out in discrete locations in the plan view shown in FIG. 3. These may also be overlapped together. For example, if the semi-transparent liquid crystal display device is formed using the polysilicon process technique, the reflective region in the pixel is formed to be overlapped on the layout of the scanning circuit, while the transparent region in the pixel is formed so as not to be overlapped on the layout of the scanning circuit, whereby it is possible to derive the effect of improving the aperture ratio and reflectivity.

In an EL display device, the fill factor may be improved by layout in which a light emitting part in a pixel is overlapped with the scanning circuit in a plan view.

Figure 8:
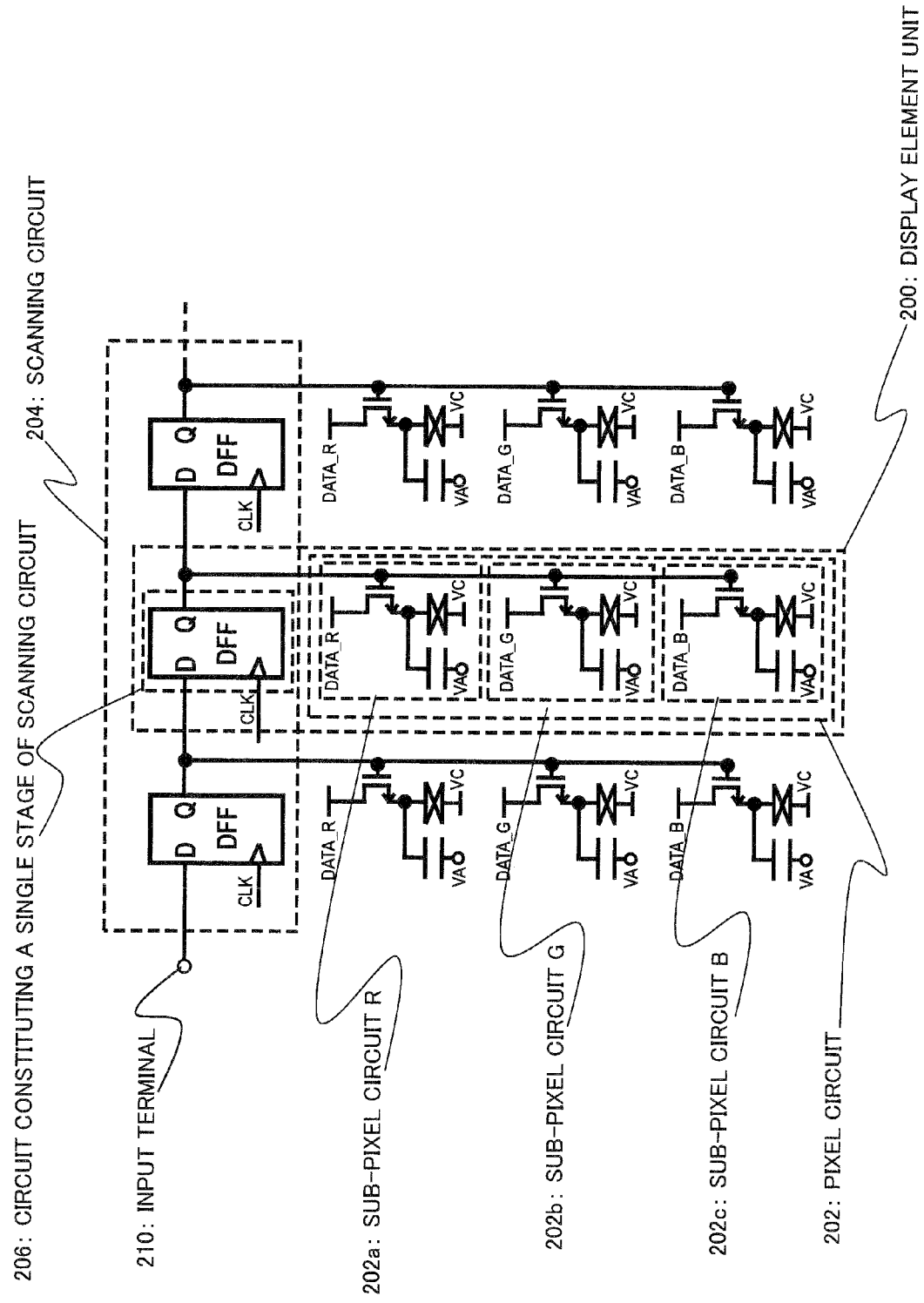
FIG. 8 is a circuit diagram of a display device of an example of the present invention.

In the present example, a pixel switch is connected to an output of a DFF, and a sole sort of a data signal of each pixel switch is coupled to the DATA node. It is however possible to connect three sub-pixels in parallel to a DFF output and three sorts of a data signal may be connected to DATA nodes to make up a color display device. In more detail, three sub-pixels 202a, 202b and 202c are connected in parallel with an output node Q of a DFF, as shown in FIG. 8. These are red (R), green (G) and blue (B) pixels, to which are coupled independent data indicated by DATA_R, DATA_G and DATA_B to implement a color display device.

In the above-described example, a non-rectangular display area is formed on a display substrate of a non-rectangular shape substantially similar to the non-rectangular display area. It is however possible to form a non-rectangular display area on a rectangular-shaped display substrate.

For example, a circular-shaped display area is formed on a rectangular-shaped display substrate, like the national flag of Japan. In this case, the four corners of the display substrate may be used as a screw attachment area for connection of the display substrate to other constituent devices or elements. In similar manner, if a doughnut-shaped display area is formed on a rectangular-shaped display substrate, the center opening area of the doughnut shape may be used as a screw attachment area. A specified example is now described.

Example 1

In the present example, a TFT substrate (Thin Film Transistor) substrate is prepared, using the polysilicon process technique, and an active matrix liquid crystal display device was fabricated using this substrate. The well-known low-temperature polysilicon TFT-LCD fabrication technique was used as fabrication process. The detailed process for fabrication IS stated in "Illustrated Low-Temperature poly-Si TFT-LCD Fabrication Process, 2005-issue, published by E-Express Co. Ltd.

Using the technique for low-temperature fabrication of polysilicon TFT-LCD, a TFT pixel switch of a planar configuration, a TFT of a scanning circuit and an electrode of the storage capacitor, were prepared to form a TFT substrate.

The TFT that forms a circuit on a display substrate was prepared as a TFT of the same process. That is, the process is such as enables the operation of a TFT in need of a high voltage.

A patterned pillar of 4 μm was prepared on this TFT substrate for use as a spacer for maintaining a cell gap and for assuring impact resistance.

A UV light curable sealant was coated outwardly of the display area of a counter substrate. The parts of the counter substrate not facing the aperture devoid of the pixels were provided with a light-shielding layer (so-called black matrix) to prohibit deterioration of the picture quality, otherwise caused by disclination. This also hides the non-regular layout such as folded part of the wiring so that the pixel aperture part will be seen by a viewer of the display device as if the pixels in the aperture are arranged at an equal pitch.

After bonding the TFT substrate and the counter substrate together, a carbon dioxide laser of a wavelength of 10.6 μm, liable to be absorbed by glass, was applied to a cutting line for heating. A coolant was sprayed immediately to produce a crack. The resulting product was pressured and severed into plural pieces each having curved outer shape. A nematic liquid crystal added by a chiral material was injected as liquid crystal material. A twisted nematic (TN) was formed by matching the rubbing direction.

Figure 9:
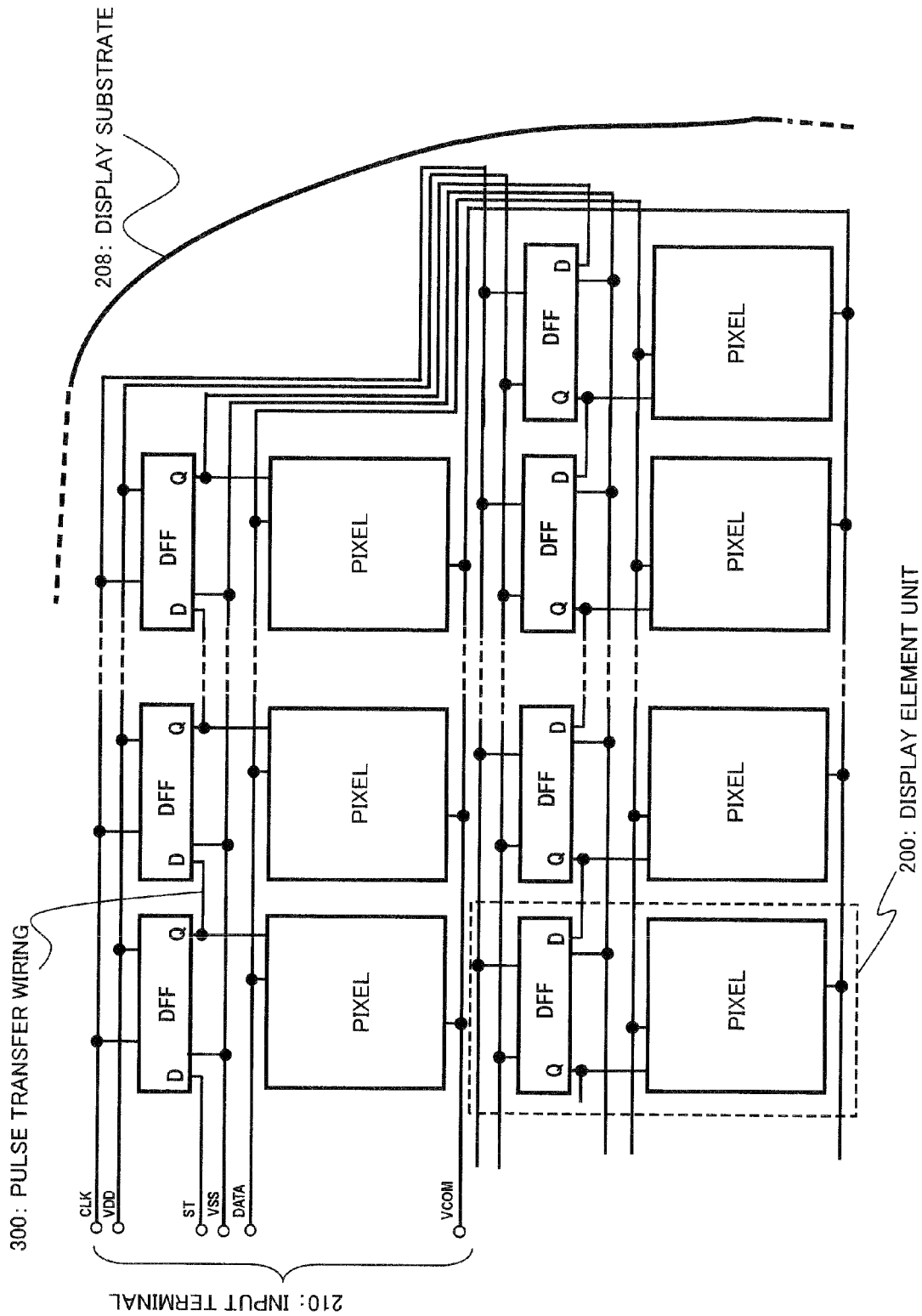
FIG. 9 is a detailed circuit diagram of an example of the present invention.

FIG. 9 shows the configuration of a circuit formed on the display substrate. FIG. 9 depicts a detailed structure of the example shown in FIG. 2 in keeping with the layout. The display element unit includes a transistor that forms a DFF circuit in a rectangular location labeled DFF, and an inner DFF wiring laid out with the transistor. The display element unit also includes a pixel transistor, a pixel electrode and a storage capacitor, laid out together at a rectangular location labeled pixel. The display element unit further includes a clock line (CLK), a first power supply wiring (VDD), a second power supply wiring (VSS), a Data wiring and a wiring for the storage capacitor (VCOM), laid out together for extending in a transverse direction.

By arranging a number of display cells, thus laid out, in a transversely extending array, the layout of a row of the display substrate was prepared.

At the ends of the first and second rows, there were added wirings for connecting the clock lines, first and second power supply lines, DATA lines and lines of the storage capacitors of the first and second rows, so that the display element units will be electrically connected together in a unicursal fashion. The display area could be formed in keeping with an optional outer shape by adjusting the number of the display cells that make up the respective rows.

The display substrate, thus prepared, and a backlight, suited to the outer shape of the substrate, were combined together to constitute the display device.

Since the display element units are arranged in a unicursal fashion, an optional transverse size may be achieved by adjusting the number of the cells of the display element units that make up a row. Further, an optional vertical size may be achieved by adjusting the number of rows. Hence, the display area matched to an optional outer shape may be achieved by adjusting the number of the display element units constituting each row.

With the present example, in which the display element units are arranged in a unicursal fashion, all pixels are necessarily addressed.

Further, with the present example, in which all display element units are electrically connected together in a unicursal fashion, the driver circuits, so far provided along the outer rim of the display substrate, may be dispensed with.

Further, with the present example, in which all display element units are electrically connected together in a unicursal fashion, the number of connection terminals for connecting the display substrate and the outer circuit, may be reduced significantly.

The number of the connection terminals equal to the number of the transverse rows of pixels, such as 100 connection terminals, as needed in the conventional system, may be reduced to only one in a configuration in which the DATA signal is provided from outside, that is, a configuration on which a data driver is not provided on the substrate, as in the present example.

Since the TABs, so far provided along the outer rim of the display substrate, may be dispensed with, the degree of freedom of the outer rim shape has been enhanced significantly. Or, since the driver circuit, so far formed along the outer rim of the display substrate, may be omitted, the frame size may be reduced. Since the driver circuit, which was to be formed along the outer rim of the display substrate, may now be eliminated, it has become possible to marrow down the frame width/length. The operation of laying out the driver circuit along the non-rectangular outer rim of the display substrate was extremely labor-consuming, in the current CAD, but the operation may now be dispensed with, resulting In a shorter designing time.

Figure 10A:
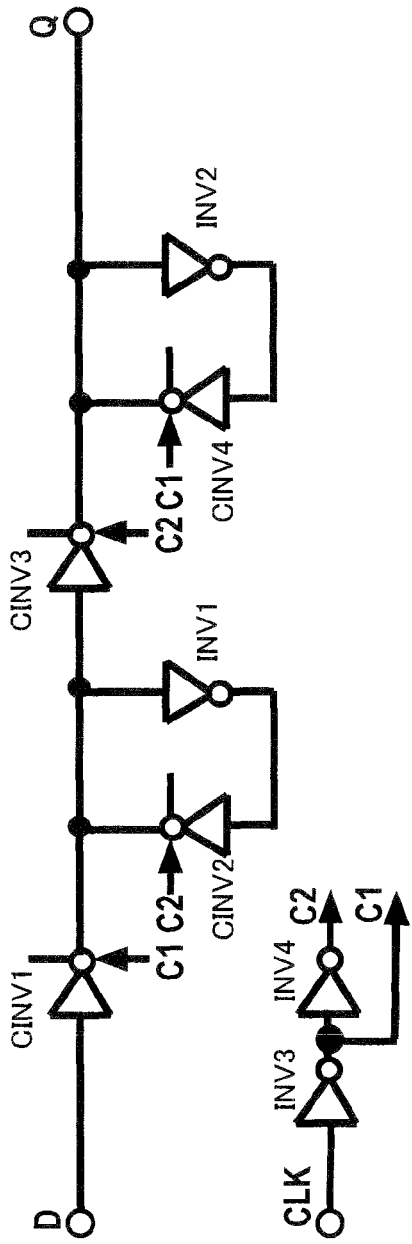
FIGS. 10A, 10B and 10C are circuit diagrams of a DFF of an example of the present invention.
Figure 10C:
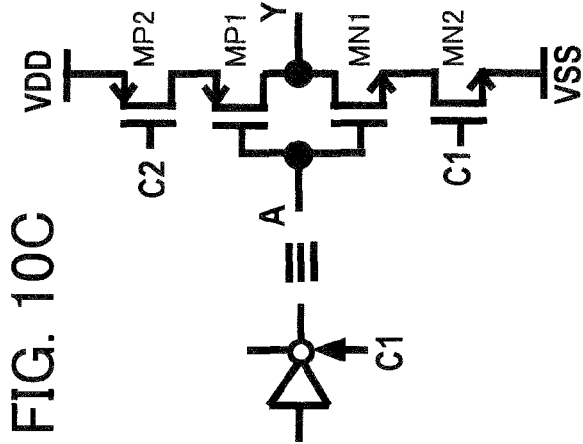
Figure 10B:
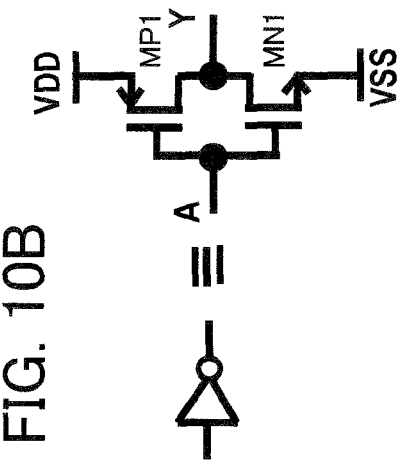

In the present example, the DFF is made up of four clocked inverters CINV1 to CINV4, two inverters INV1 and INV2 and two inverters INV3 and INV4 for generating an inverted clock signal C1 and a non-inverted clock signal C2, respectively, as shown in FIG. 10A. The configurations of the clocked inverter and the inverter are shown in FIGS. 10C and 10B, respectively. FIG. 10B depicts a CMOS inverter made up of a P-channel transistor MP1 and an N-channel transistor MN1, connected between the power supply VDD and the power supply VSS. The transistors of the CMOS inverter have gates connected in common to constitute an input node A, while having drains connected in common to constitute an output node Y. FIG. 10C depicts a clocked inverter made up of P-channel transistors MP2 and MP1 and N-channel transistors MN1 and MN2, connected between the power supply VDD and the power supply VSS. An input A is supplied to the common gates of the transistors MP1 and MN1, whilst an inverted clock C1 and a non-inverted clock C2 are supplied to the gates of the transistors MN2 and MP2.

Figure 11A:
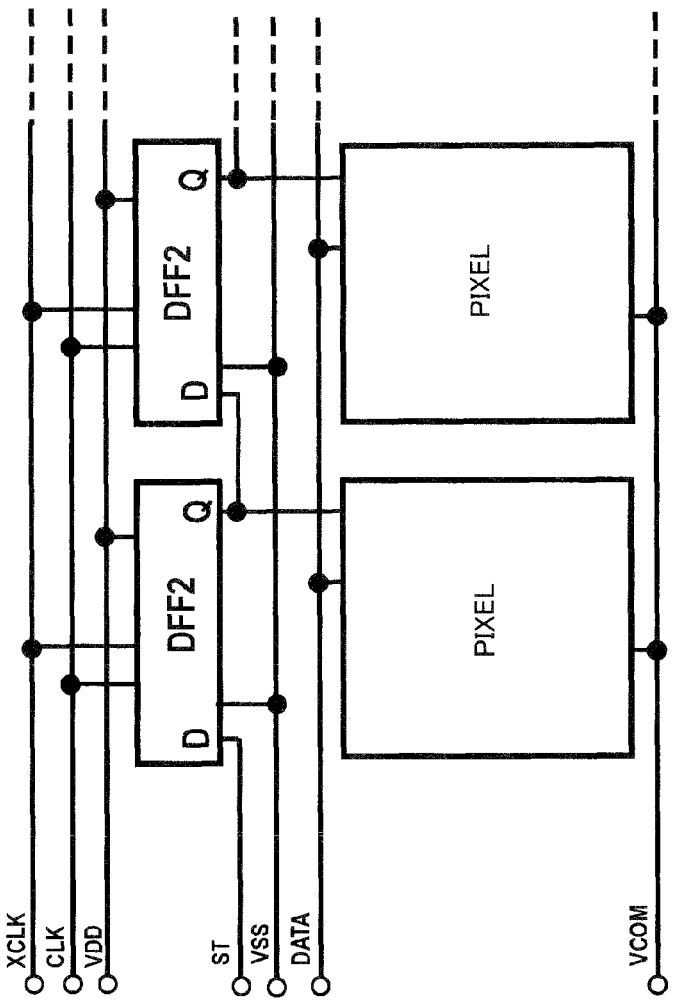
FIGS. 11A and 11B are a detailed circuit diagram showing an example of the present invention and a circuit diagram of symbols, respectively.
Figure 11B:
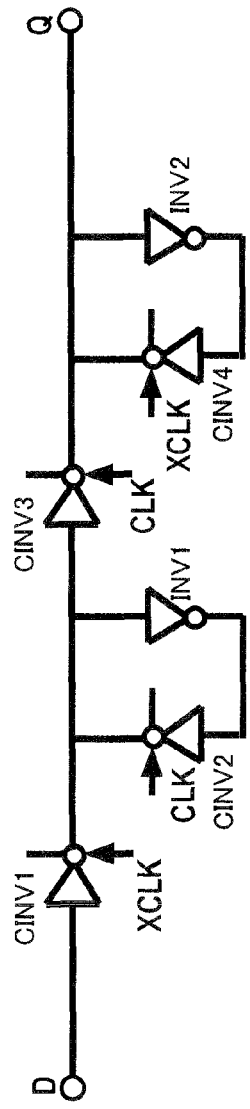

FIG. 11A shows a modification in which the two inverters in the DFF for generating an inverted clock signal and a non-inverted clock signal are omitted and a clock signal and an inverted clock signal are supplied over a bus. FIG. 11B depicts the configuration of the two-DFF circuit shown in FIG. 11A.

The clock signal and the inverted clock signal are supplied to CLK and XCLK of FIGS. 11A and 11B, respectively. In the present modification, the number of transistors needed for a pixel is 20 for the two-DFF circuit and 1 for a pixel, totaling at 21.

In the present example, the excimer laser is used for forming a polysilicon film. However, other lasers, such as continuously oscillated CW laser, may be used.

In the present example, a transmissive LCD is prepared. For producing a semi-transmissive pixel electrode, a transparent pixel electrode is initially formed, a Mo film and an Al film are sequentially deposited on the overall surface, and a photoresist pattern is then formed. The Al film and the Mo film are simultaneously patterned, and the photoresist pattern is then removed to provide the configuration of a semi-transmitting pixel electrode, carrying the reflective electrode.

The transistors and the wirings, provided in the display element units, laid out on the display substrate, are laid out such that the transistors and the wirings are overlapped with the reflection electrodes, when viewed in plan, while the transistors and the wirings are arranged underneath the reflection electrodes, when viewed in cross-section, thereby improving the aperture ratio of the pixels and the area of reflection.

In the present example, the clock line, power supply line, data wiring and the wiring for the storage capacitors are arrayed unicursally. However, the unicursal array is not mandatory.

For example the data wirings may be arrayed vertically and the vertically arrayed pixels may then be connected, provided that the wirings are electrically connected together and connected to an input terminal. However, at least the scanning circuit needs to be arrayed unicursally.

Figure 12:
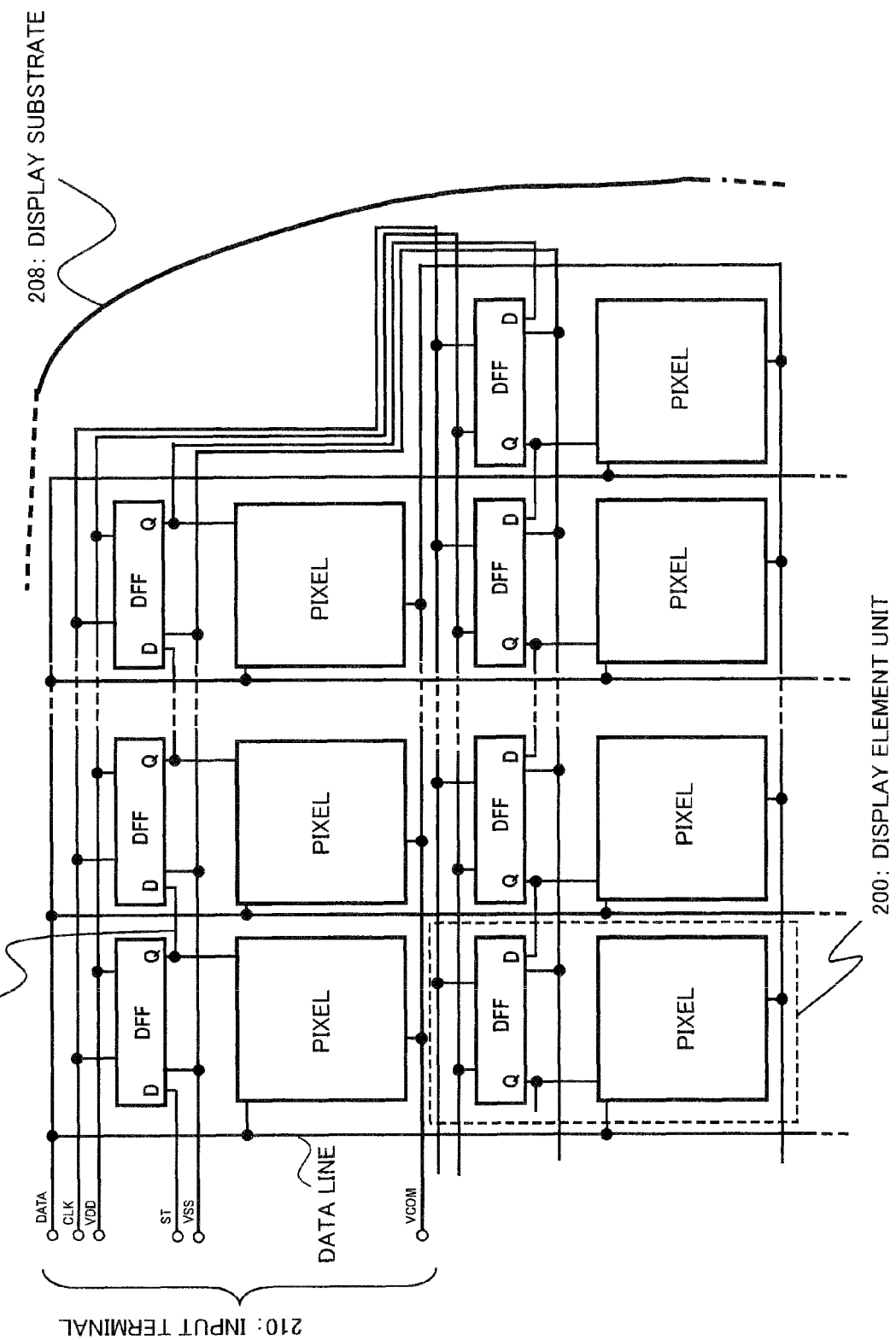
FIG. 12 is a detailed circuit diagram showing an example of the present invention.

FIG. 12 shows an example of the circuit layout of the present invention. Referring to FIG. 12, a plurality of data wirings are arrayed vertically and the vertically arrayed plural pixels are connected in common to the data wiring. The data wirings are electrically connected together and connected to the input terminal (DATA).

Since the course for drawing the clock line around differs from that for drawing the data wirings around, attention has to be paid to signal timing design. In more detail, the data signal timing is designed so that data may be written in both the pixels lying remotest from and those lying closest to the input terminal of the clock line (CLK).

In the present example, the clock signal is supplied over a clock line to each DFF. A relay buffer may be provided halfway on the clock line in consideration of the load capacitance of the clock line. In this case, the relay buffer is desirably provided at e.g., the folded part of the scanning circuit, that is, at an end of the display area, in order to keep layout rules of the display area.

Example 2

In the case of the example 1 of FIGS. 11A and 11B, 21 transistors for each pixel and a two-phase clock signal, namely a clock signal for driving the scanning circuit and the inverted clock signal, are required.

The present example, which will now be described, has been devised by the present inventor to reduce the number of the transistors and the number of the clock signals.

Figure 13:
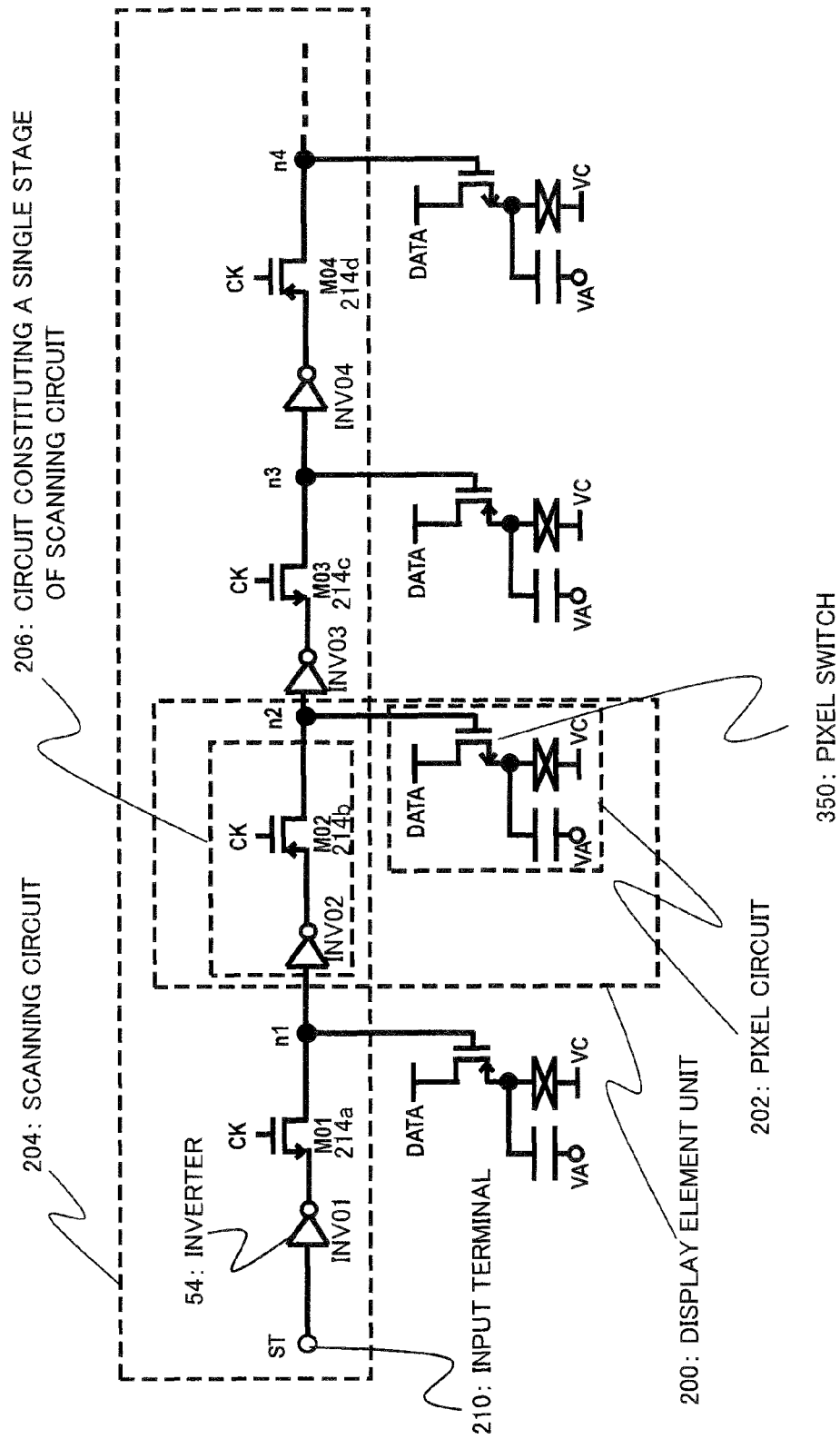
FIG. 13 is a circuit diagram showing an example of the present invention.

FIG. 13 shows the configuration of the scanning circuit and the pixel circuit of the present example. In FIG. 13, a display device (200) is made up of a circuit (206), forming a stage of the scanning circuit, and a pixel circuit (202), connected to an output node of the circuit (206). This circuit (206), forming a stage of the scanning circuit, is made up of a sole inverter circuit and a sole switching transistor. Switching transistors 214*a* and 214*c* are of the n-type and switching transistors 214*b* and 214*d* are of the p-type. That is, the first-stage switching transistor 214*a*, second-stage switching transistor 214*b* and the third-stage switching transistor 214*c* of the scanning circuit are of the n-type, p-type and of the n-type, respectively. The switching transistors of the odd stage are of the n-type, whereas the switching transistors of the even stage are of the p-type, respectively.

Output nodes n1, n2, n3, . . . of the respective stages of the scanning circuit are each connected to a pixel switch. The pixel switch, connected to the node 1, is of the p-type, that connected to the node n2 is of the n-type and that connected to the node n3 is of the p-type, and so forth. That is, the pixel switches connected to the odd and the even stages of the scanning circuit are of the p-type and the n-type, respectively. Hence, the display device may be constituted by four transistors per pixel.

Also, the scanning circuit may be driven by a single-phase clock signal. Since the clock signal is a single-phase signal, and only one transistor suffices to drive each stage of the scanning circuit, it is possible to reduce the load capacitance of the clock line and clock delay.

Figure 14:
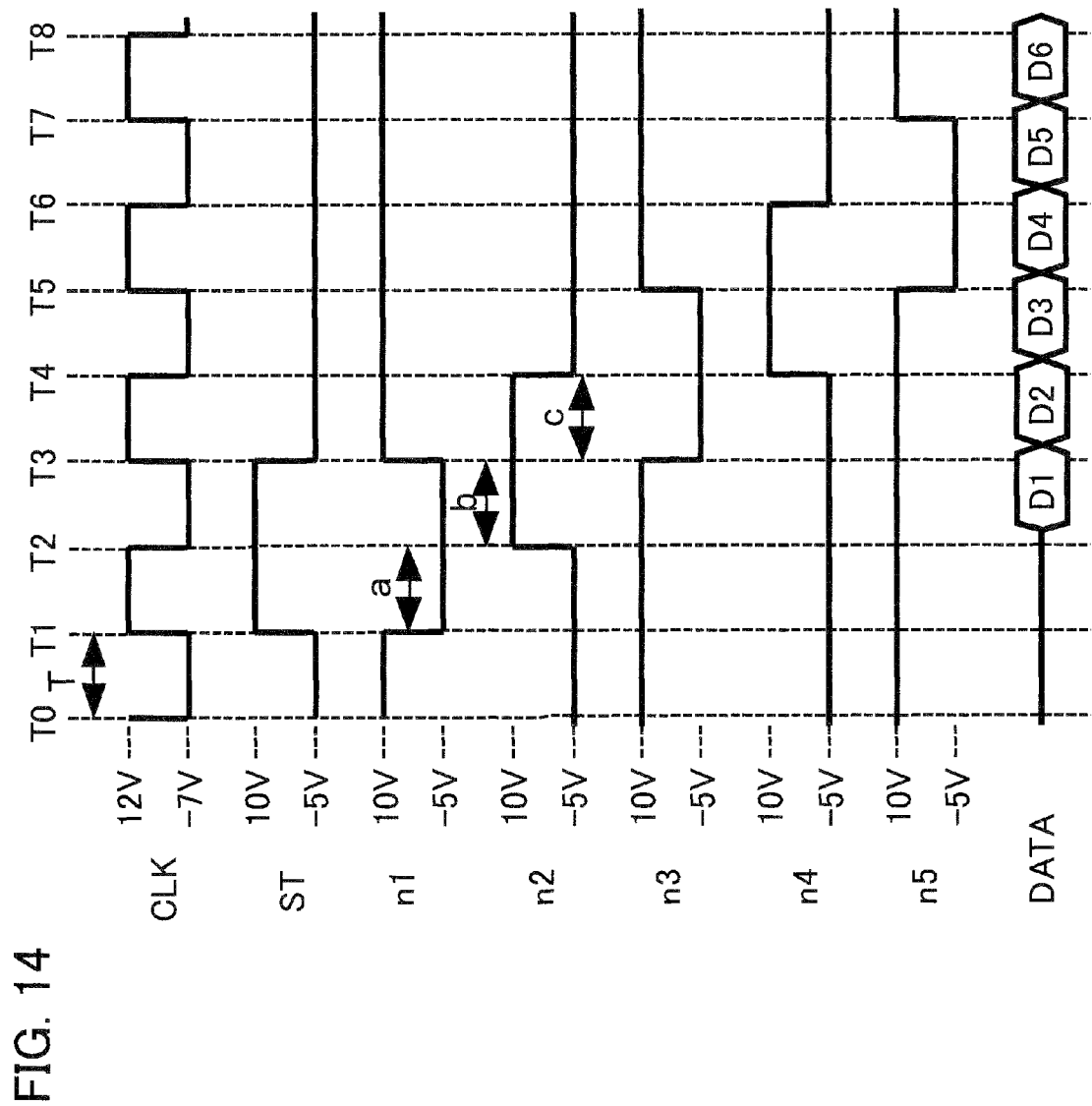
FIG. 14 is a timing chart showing the operation of the circuit shown in FIG. 13.

The operation of the scanning circuit and the pixel circuit, constructed as described above, will now be described. FIG. 14 depicts a timing diagram for illustrating the operation of the present example. Referring to FIG. 14, an active-high pulse signal (one-shot pulse) of a pulse width of 2×T, T being a one-half period of the clock signal, is routed, as an input signal ST, to a terminal ST, at a rise timing from the low level to the high level of the clock signal CLK, whereby a pulse signal, inverted from that at ST, is output at the node 1.

This signal becomes an input signal of a circuit forming a single stage of the scanning circuit constituting the next-stage display element unit, such that a pulse signal is output, at a node n2, at a falling timing of the clock signal CLK, with a delay of T as from the signal at the node n1.

During a period "a" attached to the pulse signal waveform at the node n1, the n-type transistor M01 is on, so that the node n1 is in a low impedance state. So, an inverted version of the pulse signal of the signal received at ST is output at the node n1.

During a period "b", the transistor M01 is off, and the node n1 is in a high impedance state, so that the voltage is retained by the capacitance at the node n1.

Hence, an active-low pulse signal, with a pulse width of 2×T, is output at the node n1.

During the period "a", the p-type transistor M02 is off, and hence the impedance is high. During the period "b", the p-type transistor M02 is on, and hence the impedance is low, so that a high level signal, inverted from the input of the inverter INV02, is output at the node 2.

During the period "c", the transistor M02 is off, and the node 2 is in a high impedance state. The voltage is retained by the capacitance at the node n2. Thus, an active high pulse signal of the pulse width 2×T is output at the node n2.

In this manner, an active-low pulse and an active-high pulse are sequentially output at nodes n3, n4, respectively, each with delay of the pulse period T.

In this manner, active-low pulses may be generated at odd-stage outputs of the scanning circuit at the nodes n1, n3, n5, . . . , whilst active-high pulses may be generated at its even-stage outputs at the nodes n2, n4, n6, . . . .

Referring to FIG. 13, the polarities of the pixel switches are set so that the pixel switches will be turned on by these polarities of the scanning pulses. That is, a p-type transistor is provided at each pixel switch connected to an odd stage output of the scanning circuit, whereas an n-type transistor is provided at each pixel switch connected to its even stage. Thus, the pixel switch, connected to the node n1, is on during a sequence of periods "a" and "b".

During the "on" periods of the pixel switch, the capacitance of the liquid crystal cell and that at the storage capacitor is charged/discharged in keeping with the voltage signal of the data signal DATA to determine the voltage written in the pixel at the off-timing of the pixel switch.

Hence, the voltage signal, written in the pixel, connected to the node n1, becomes equal to D1 written in the DATA node at the rise timing of the node n1.

Similarly, the voltage written in the pixel, connected to the node n2, becomes the voltage signal D2 applied to the DATA node at the falling timing at the node n2. In this manner, the voltage to be written in the pixel is sequentially applied, at each period T, to the DATA node.

The scanning circuit sequentially addresses the pixels, beginning from the pixel connected to its initial stage, up to the pixel connected to its trailing stage, thereby writing data for one frame in these pixels.

The pixel circuit connected to the even stage of the scanning circuit differs in circuit configuration from the pixel circuit connected to its odd stage, with the result that the corresponding difference is produced in the display characteristic. To keep up the picture quality as a display device, the pixel circuits need to be ingenuously laid out so that different pixel circuits will be arrayed in both the horizontal and vertical directions.

The circuit of the present example was formed on a glass substrate, and a display device was implemented with the use of a driving system in which the polarity of the common electrode is reversed. The voltage applied to the liquid crystal was set in a range from 0V to 5V, so that sufficient contrast will be achieved. One of the voltages, in case of reversion of the polarity of the common electrode, was set to 0V, while the other voltage was set to 5V. Since the voltage at the pixel electrodes ranges from −5V to 10V, in this case, a voltage less than −5V and a voltage higher than 7V are needed to turn the pixel switch off and on, respectively, in case the pixel switch is of the n-type.

When the pixel switch is of the p-type, a voltage higher than 10V and a voltage less than −2V are needed to turn the pixel switch off and on, respectively. For this, the voltage range needed at the output stage is from −5V or less and up to more than 10V or higher. To enable this, the power supply voltages of the inverter were set to −5V and 10V. To transfer the voltage signals of these amplitudes by the switches M01 to M04, the clock signal voltage was set to −7V and 12V. These may be summarized as follows:

That is, in the present example, the voltage of the DATA signal ranges between 0V and 5V, the power supply voltages for the inverter are −5V and 10V and the low and high levels of the clock signal are −7V and 12V, respectively.

With the above circuit, four transistors suffice per pixel, while a single phase clock signal suffices for driving the scanning circuit.

That is, if the present circuit is compared to FIG. 11 of the example 1, the area taken up by the transistors or line per pixel, is reduced, thus improving the aperture ratio or the resolution of a transmissive liquid crystal display device.

In the present example, the scanning circuit is of the dynamic circuit configuration. However, the circuit configuration may be modified to a static configuration by suitably adding feedback circuits. Although FIG. 13 shows a configuration in which a number of display element units (200), each made up of the circuit (206) and the circuit (202), forming a stage of the scanning circuit, are stringed in a row, the configuration may be branched, if so desired.

Example 3

Figure 15A:
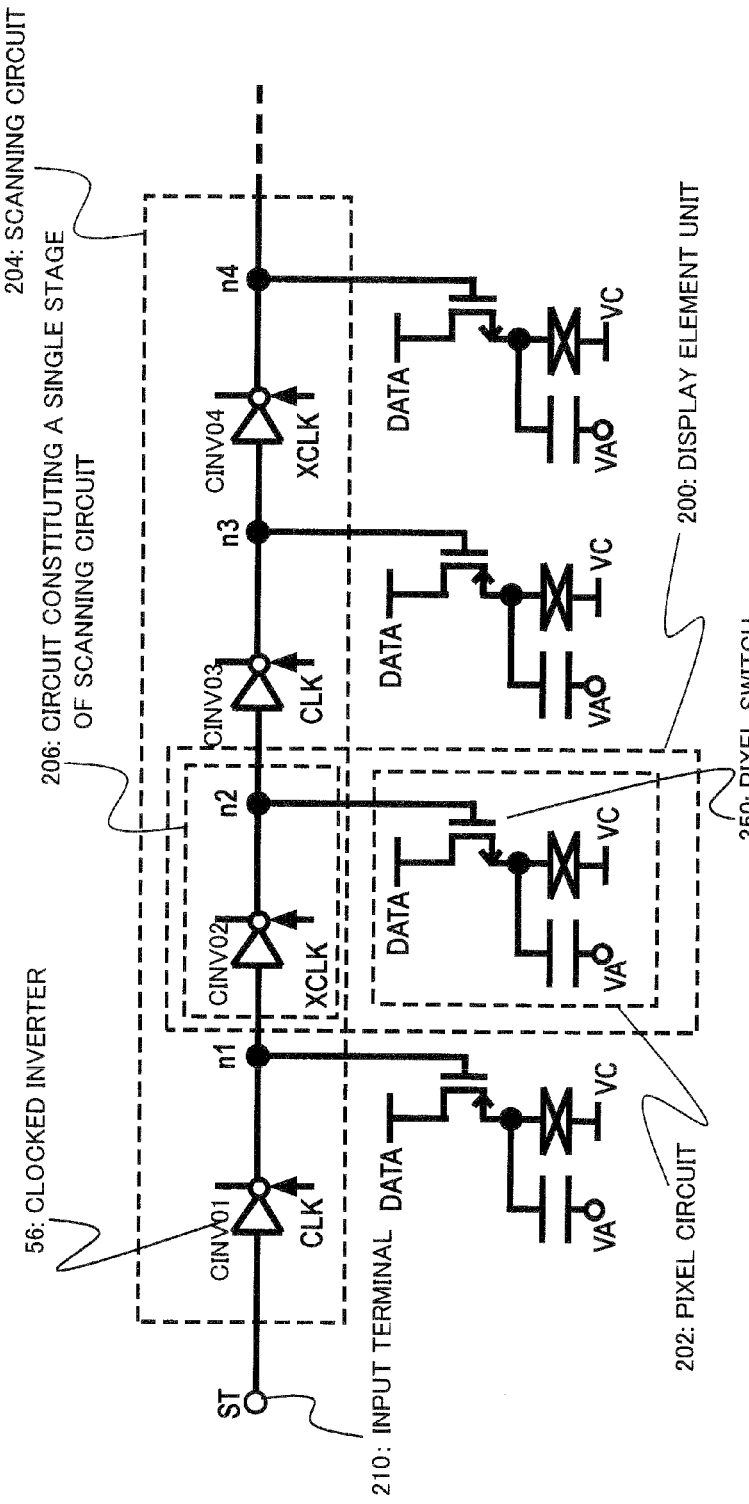
FIGS. 15A and 15B are a circuit diagram showing an example of the present invention and a circuit diagram showing a modification thereof, respectively.
Figure 15B:
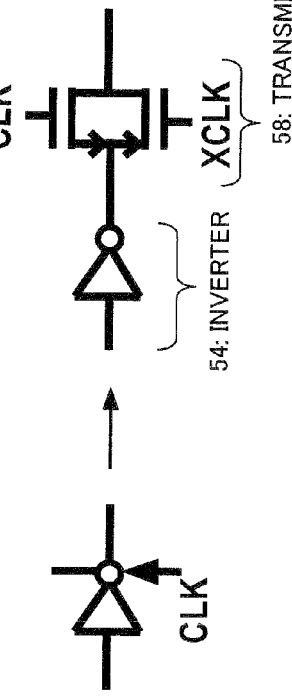

An example 3 of the present invention will now be described. Referring to FIGS. 15A and 15B, the scanning circuit (204) of the present example includes a clocked inverter (56) per stage of the scanning circuit.

A sole pixel switch (350) is connected to output nodes n1, n2, n3, . . . of the circuit (206) that constitutes a stage of the scanning circuit. The pixel switch, connected to the output node 1, is of the p-type, that connected to the output node n2 is of the n-type and that connected to the output node n3 is of the p-type, and so forth. That is, the pixel switches connected to the odd and the even stages of the scanning circuit are of the p-type and the n-type, respectively.

Thus, a display device may be implemented using five transistors per pixel. The clock signal that drives the scanning circuit is CLK and its inversion XCLK.

Figure 16:
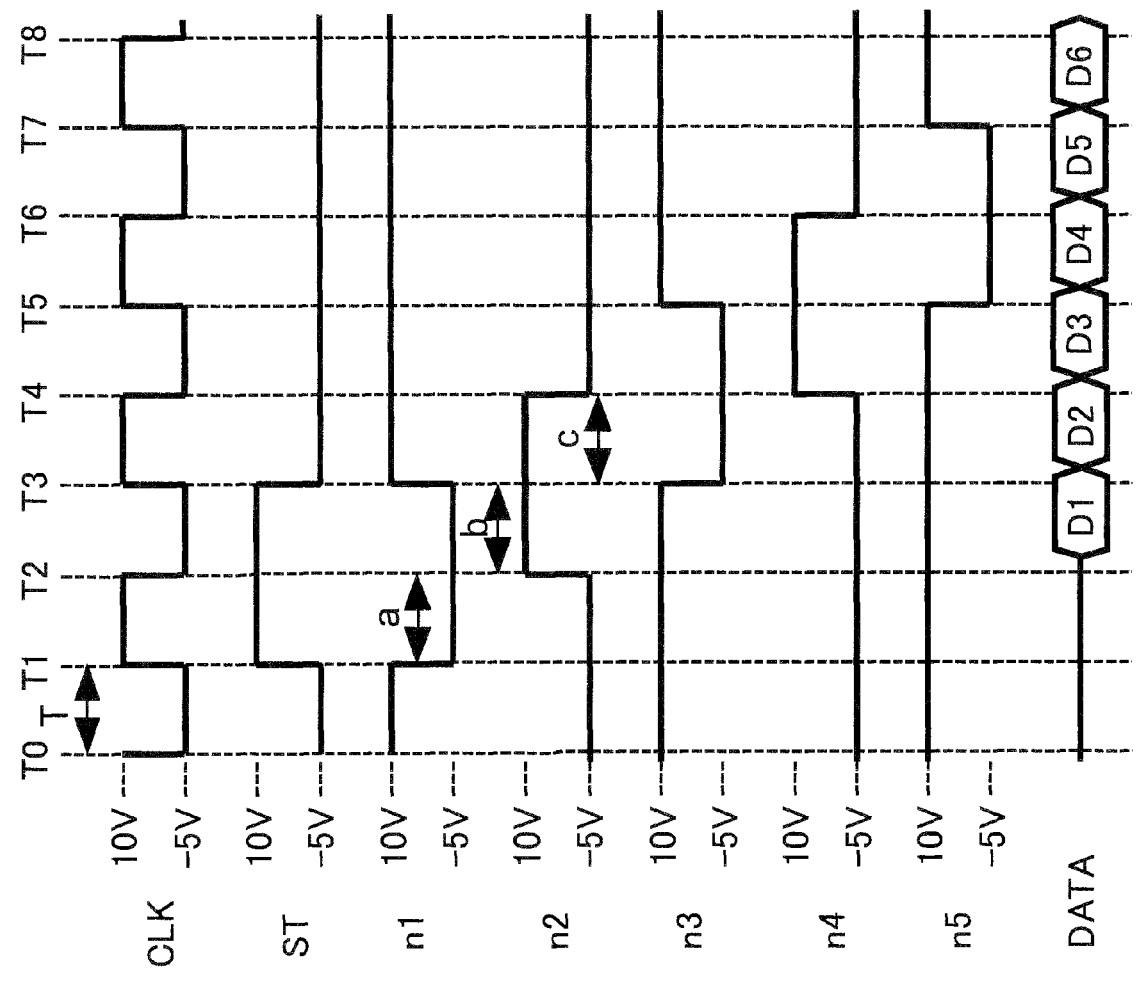
FIG. 16 is a timing chart showing the operation of the circuit shown in FIGS. 15A and 15B.

The operation of the scanning circuit and the pixel circuit, constructed as described above, is now described. FIG. 16 depicts a timing diagram for illustrating the operation of the present example. Referring to FIG. 16, an active-high pulse signal of a pulse width 2×T, T being a one-half period of the clock signal, is routed, as an input sign al ST, at a rise timing from the low level to the high level of the clock signal CLK, whereby a pulse signal inverted from that at ST is output at the node 1. This signal becomes an input signal of a circuit (206) forming a single stage of the scanning circuit constituting the next-stage display element unit, such that a pulse signal is output, at a node n2, at a falling timing of the clock signal CLK, with a delay of T as from the signal at the output node n1.

During a period "a" attached to the pulse signal waveform at the node n1, the output node of a clocked inverter CINV01 is in a low impedance state, so that the node n1 is in a low impedance state. So, an inverted version of the pulse signal, received at ST, is output at the output node n1.

During a period "b", CLK is low and the output node n1 is in a high impedance state. The voltage is retained at a capacitor of the output node n1. Thus, an active-low pulse signal of the pulse width 2×T is output at the node n1.

The output node n2 is in a high impedance state during the period "a", and is in a low impedance state, during the period "b", to output a high level signal which is an inverted version of an input signal of the inverter CINV02. During the period "c", the output node n2 is in a high impedance state to retain the voltage by the capacitance at the output node n2. Thus, the output node n2 outputs an active-high pulse signal of the pulse width 2×T.

In this manner, odd-stage outputs of the scanning circuit, i.e., output nodes n2, n4, n6, . . . may generate active-high scanning pulse signals.

In this manner, odd-stage outputs of the scanning circuit, i.e., the output nodes n1, n3, n5, . . . may generate active-low scanning pulse signals, whereas even-stage outputs of the scanning circuit, i.e., the output nodes n2, n4, n6, . . . may generate active-low scanning pulse signals.

Referring to FIGS. 15A and 15B, the polarities of the pixel switches are set so that the pixel switches will be turned on with the scanning pulse signal of the polarity shown, in the same manner as described with reference to FIG. 13.

Hence, the voltage signal, written in the pixel, connected to the output node n1, is D1 applied to the DATA node at the rise timing at the output node n1.

Similarly, the voltage written in the pixel, connected to the output node n2, is the voltage signal D2 applied to the DATA node at the falling timing at the output node n2.

In this manner, the voltages to be written in the respective pixels are sequentially applied to the DATA node at the period T.

In the present example, in contradistinction from the previous example, the low level voltage and the high level voltage of the clock signal are the same as those of the power supply voltages of the clocked inverter. Thus, in the present example, the number of the sorts of the power supply voltages to be provided for driving the display device as well as the voltages to be applied to the transistors may be reduced to advantage.

With the above-described circuit, five transistors are needed per pixel, while two phases of the clock signal are needed for driving the scanning circuit. The amplitude of the voltage of the clock signal may be the same as that of the power supply voltage of the clocked inverter.

In the present example, the circuit configuration is the dynamic configuration. However, the circuit configuration may be changed to the static configuration by adding feedback circuits if so desired.

In the present example, the configuration made up of an inverter 54 and a transmission gate 58 may be used in place of the clocked inverter, as shown in FIG. 15B. The operation and the feature of the circuit of FIG. 15B is the same as those of the circuit employing the clocked inverter.

Example 4

Figure 17A:
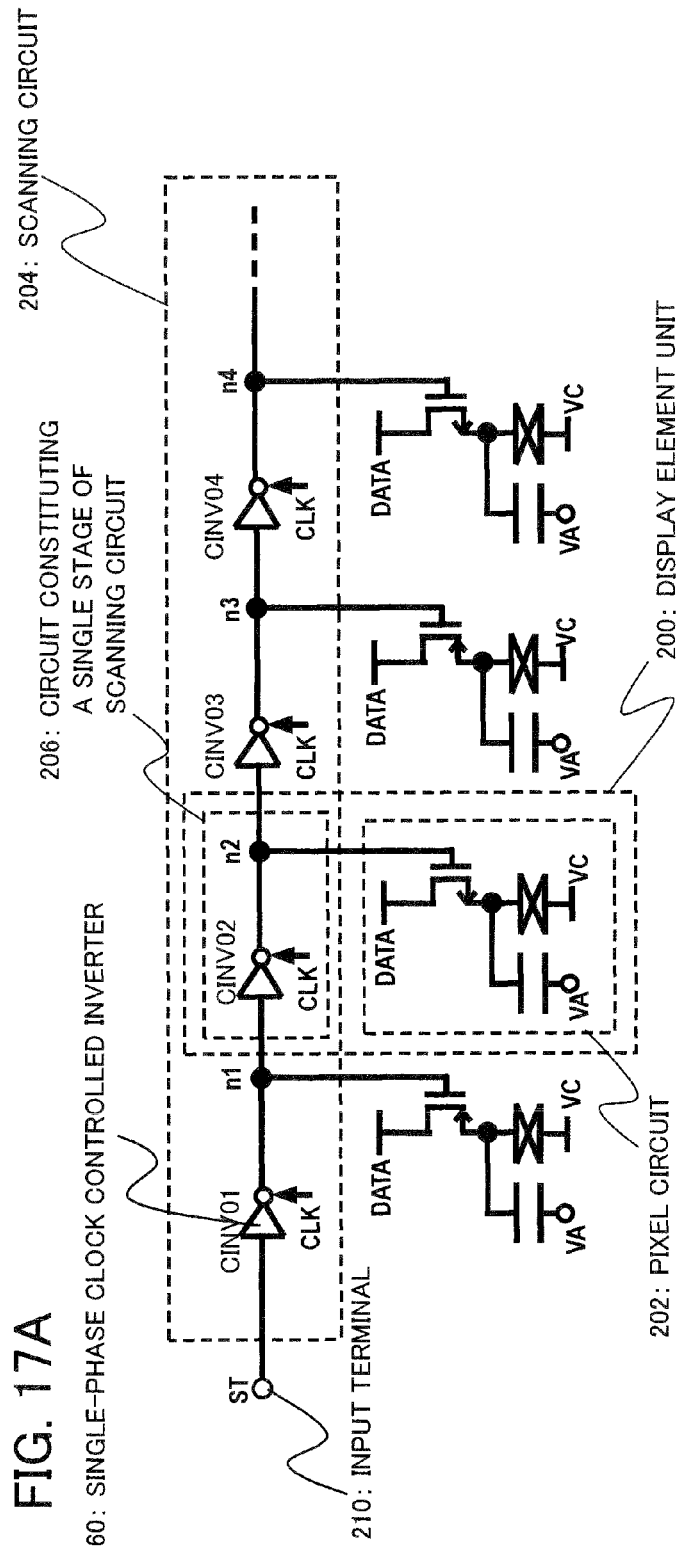
FIGS. 17A, 17B and 17C are a circuit diagram showing an example of the present invention, a circuit diagram of a single-phase clock controlled inverter and a truth table, respectively.
Figure 17B:
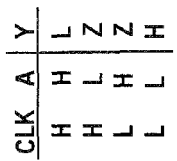
Figure 17C:
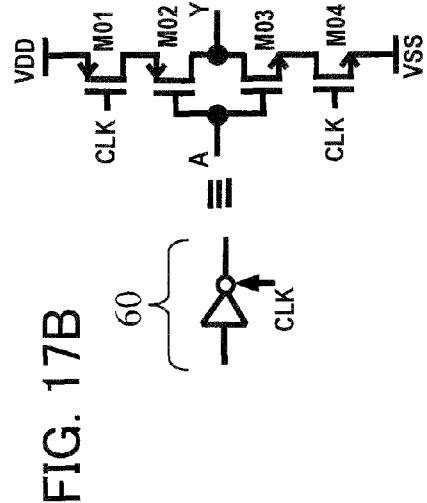

In the present example 4, the number of the transistors is five, the clock signal is the single-phase clock signal, and the amplitude of the voltage of the clock signal is the same as that of the power supply voltage. FIGS. 17A to 17C shows the configuration of the example 4 of the present invention. Referring to FIG. 17A, the display circuit includes a circuit (206), forming a single stage of the scanning circuit, and a pixel circuit (202), having an output signal of a single-phase clock controlled inverter (60) as an input.

FIG. 17B shows the circuit configuration of the single-phase clock controlled inverter (60) shown in FIG. 17A. Referring to FIG. 17A, two P-type MOS transistors M01 and M02 and two n-type MOS transistors M03 and M04 are connected in cascode, between a power supply VDD and the ground potential VSS. An input signal is supplied to the gates of the transistors M02 and M03. An output signal is taken from the connection of the drains of the transistors M02 and M03. A clock signal is supplied to each of the transistors M01 and M04.

The operation of the single-clock controlled inverter is now described with reference to a truth table shown in FIG. 17C.

When the clock signal is at a high level, the p-type MOS transistor M01, the source electrode of which is connected to the power supply voltage VDD, is off, while the n type MOS transistor M04, having a source electrode grounded, is on. If the input signal is high in level at this time, the output signal of the single-phase clock controlled inverter (60) is low in level, whereas, if the input signal is low in level, the output signal is high in impedance.

If conversely the clock signal is at a low level, the p-type MOS transistor M01, the source electrode of which is connected to the power supply voltage VDD, is on, while the n type MOS transistor M04, having a source electrode grounded, is off. If the input signal is high in level at this time, the output signal of the single-phase clock controlled inverter is high in impedance, whereas, if the input signal is low in level, the output is high in level.

Figure 18:
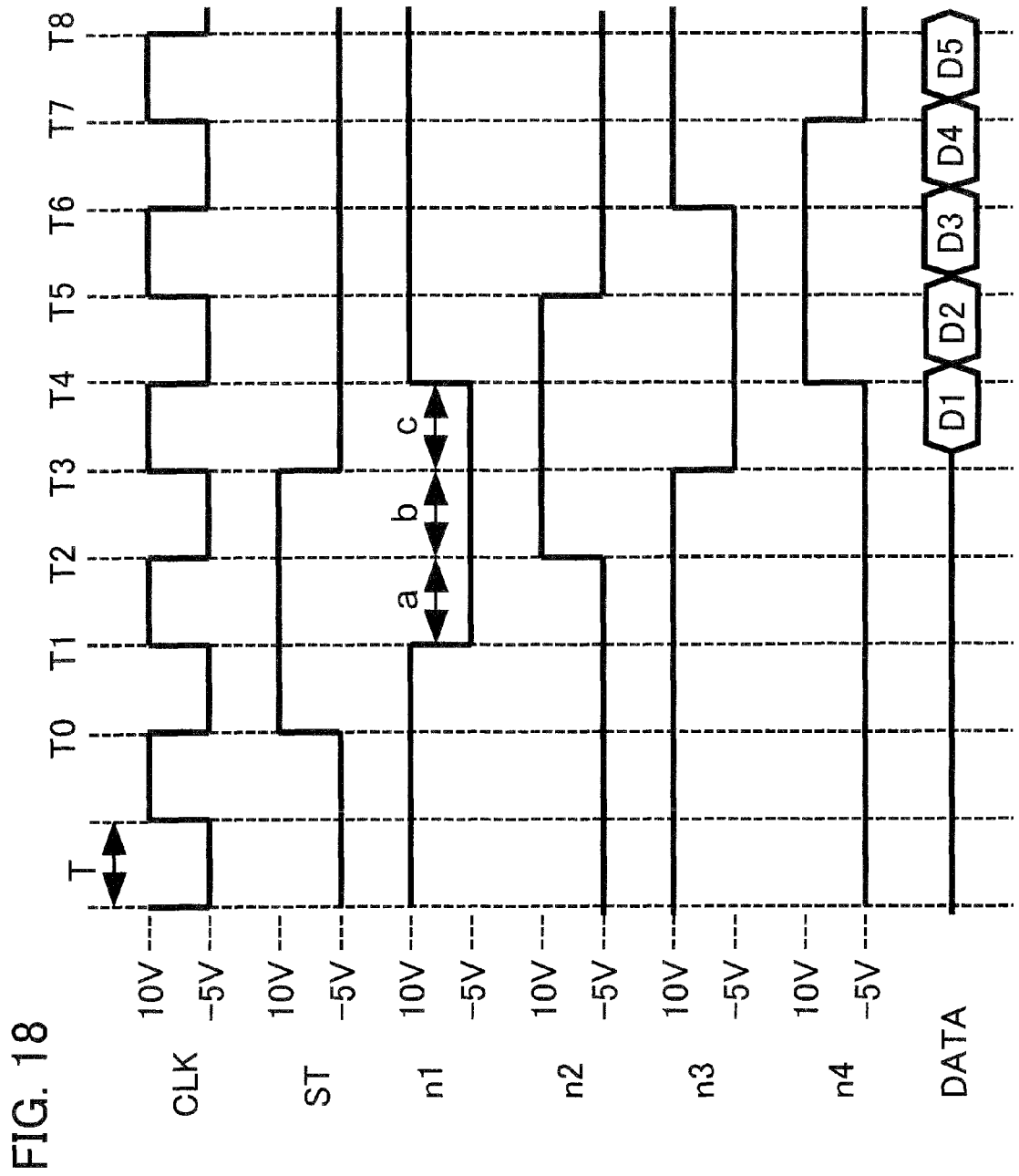
FIG. 18 is a timing chart showing the operation of the circuit shown in FIGS. 17A to 17C.
Figure 19:
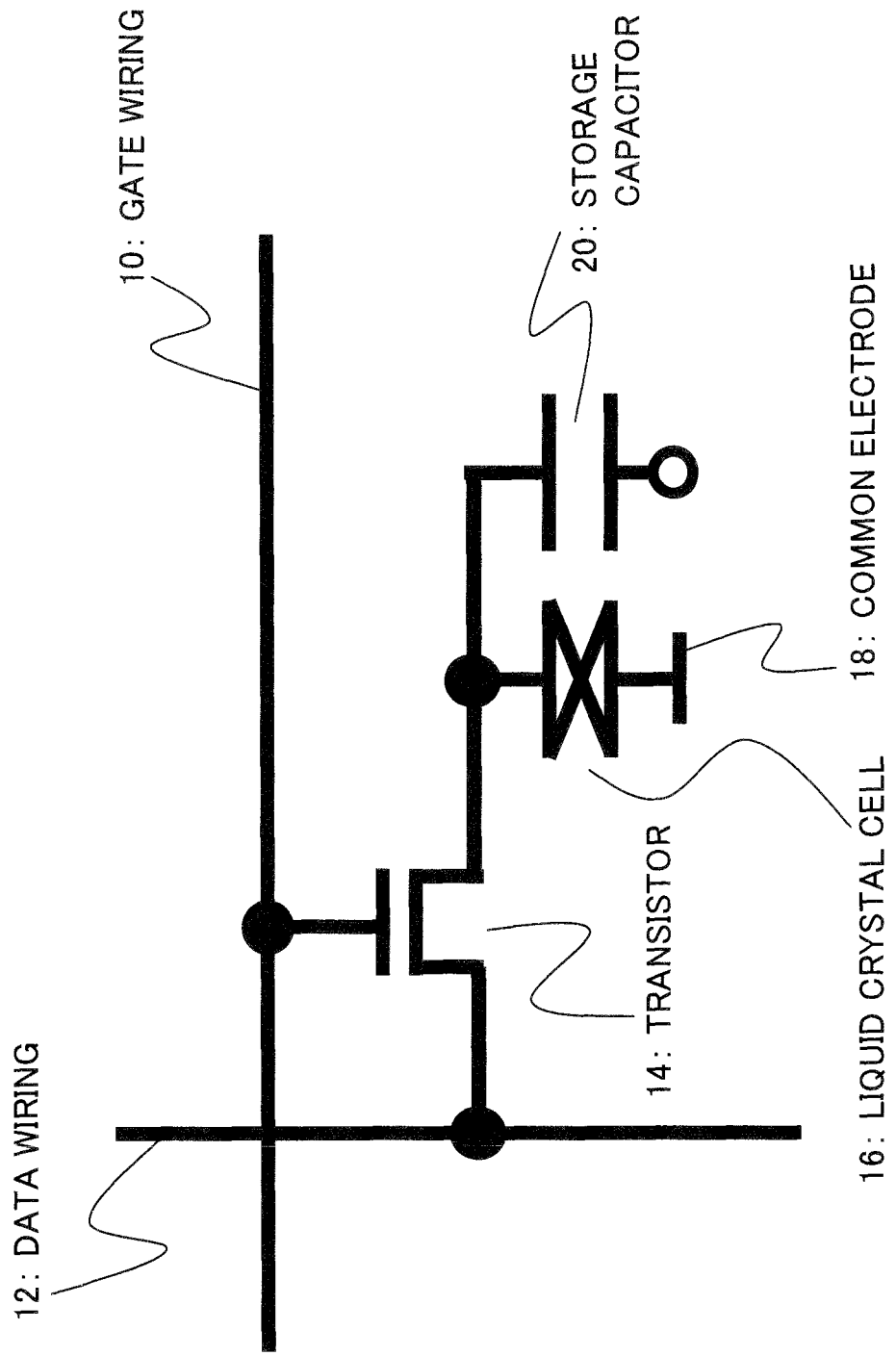
FIG. 19 is a diagram for a pixel of a typical active matrix liquid crystal display device.
Figure 20:
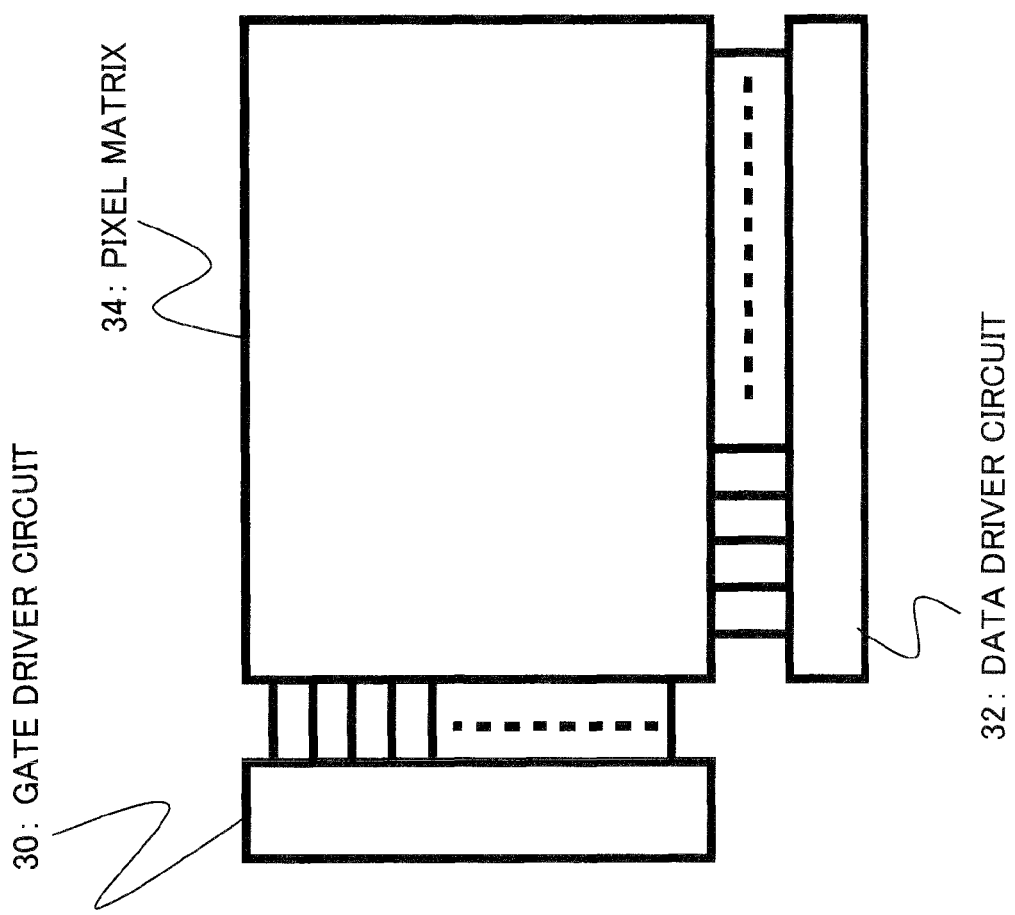
FIG. 20 is a plan view showing a typical active matrix liquid crystal display device.

The operation of the display circuit of the present example is now described with reference to FIG. 18 showing a timing chart for illustration.

A pulse signal of a pulse width 3×T, T being a one-half period of the clock signal, is supplied, as an input signal, at a falling timing from the high level to the low level of the clock signal CLK, whereby an inverted pulse signal is output at the node n1 at the falling timing of the clock signal CLK.

This signal becomes an input signal of the next stage single-phase clock controlled inverter, such that a pulse signal is output, at a node n2, at a falling timing of the clock signal CLK, with a delay of a period T as from the signal at the output node n1.

During the periods "b" and "c", attached to the pulse signal waveform at the node n1, the output of the single-phase clock controlled inverter CINV01 is in a high impedance state. However, the voltage during the period "a" is retained by the capacitance at the node n1.

Thus, by the single-phase clock output CLK, an active-low scanning pulse signal may be generated at the outputs of the odd-numbered stages of the nodes n1, n3, n5, . . . , whilst an active-high scanning pulse signal may be generated at the outputs of the even-numbered stages of the nodes n2, n4, n6, . . . in the scanning circuit.

Referring to FIGS. 17A to 17C, the polarities of the pixel switches are set so that the pixel switches will be turned on with the scanning pulses of the polarities shown.

The voltage signal, written in the pixel, connected to the node n1, becomes D1, applied to the DATA node, at the rise timing at the node n1.

Similarly, the voltage signal, written in the pixel, connected to the node n2, becomes D2, applied to the DATA node, at the falling timing at the node n2.

In this manner, the voltages to be written in the respective pixels are sequentially routed to the DATA nodes, at intervals of a period T. Since the clock signal is again of a single-phase in the present example, the capacitance of the clock line is small and the clock delay is also small.

Other Example

In the above example, description has been centered about the liquid crystal display formed using the polysilicon process technique. However, the present invention may also be applied to an organic EL display device, the scanning circuit and the pixel circuit of which are formed of polysilicon.

In the above example, an instance in which the scanning circuit and the pixel circuit are formed by a thin-film process on a glass substrate has been described. However, the present invention may similarly be applied to a display device in which the scanning circuit and the pixel circuit are formed on other insulating substrates or a silicon substrate.

In the above example, planar display on a glass substrate has been described. Alternatively, a flexible display device may also be formed by peeling off a scanning circuit or a pixel circuit, prepared using the polysilicon process, from a glass substrate, and by transcribing the circuits on a flexible substrate. The so formed flexible display device may then be processed to produce a display device presenting a curved surface.

The scanning circuit and the pixel circuits, connected to respective output nodes of the scanning circuit, may be formed on an elongated flexible substrate which is then wrapped around a support to form a planar display surface.

The present invention may be applied to advantage for a mobile electronic device, such as mobile phone terminal or mobile media player. Since a display device of an optional outer shape, taking up a large volume or space, may be provided as a component part of the mobile electronic device, the degree of freedom in designing the electronic device may be improved, as a result of which a mobile electronic device with improved fashionability may be produced.

Among examples of use of the present invention, there are variable sorts of small-sized electronic equipment, such as an electronic still camera or a video camera. With this sort of the electronic equipment, it is becoming difficult to procure a sufficient and compact space in which to install a display panel on the electronic device. With the use of the display device of the present invention, a display panel may be arranged by exploiting spaces of variable shapes.

Among other examples of use of the present invention, there are various accessories, such as pendants, timepieces or buttons. Through the use of the present invention, the display device can be installed on these accessories. By so doing, design features of these accessories may be highlighted to meet the user's taste to help increase the sale.

Among further examples of use of the present invention, there are various meters mounted on a bicycle or a car. With the use of the display device of the narrow frame size and the optional outer shape, characteristic of the present invention, it is possible to fabricate the meters with the smallest possible mounting space. The field of view, otherwise interrupted by these meters, may be diminished to improve the safety.

Among further examples of use of the present invention, there are display devices installed on commodity demonstration racks or shelves for sale promotion. A display device of a fantastic design will attract the customers' attention to improve the ad effect. Since the total area of the display device of an optional outer shape may be used as a display area, the proportion of the space taken up by the display device of an arbitrary shape to that taken up by commodities, placed on the shelves at the back side of the display device, may be reduced.

Among further examples of use of the present invention, there are variable sorts of amusement equipment, such as pachinko table. For example, if a tulip-shaped display device is prepared through use of the present invention and mounted on a tulip base of the conventional pachinko table, the pachinko table will appear more luxurious to help promote the sale of the pachinko shop.

Among still further examples of use of the present invention, there are ring-shaped accessories or ornaments, such as rings or bracelets. In these, hitherto unprecedented design features may be produced to help promote the sale. As described above, in the display device according to the present invention, a plurality of pixel circuits are able to be provided with plural items of data, respectively, and hence any image, such as a character or logo, still image and moving image can displayed.

Although the present invention has so far been described with reference to preferred examples, the present invention is not to be restricted to the examples. It is to be appreciated that those skilled in the art can change or modify the examples without departing from the scope and spirit of the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A TFT surface display device, comprising:
a plurality of display element units that are arranged on a display substrate and that include a plurality of unit circuits, and a plurality of pixel circuits, each unit circuit provided in association with each display element unit, each unit circuit having i) a single input node to receive a scanning signal, and ii) a single output node to output said scanning signal, each one pixel circuit connected directly to said output node of each unit circuit in one-to-one correspondence, a plurality of stages of said unit circuits being cascade connected to transfer said scanning signal from a preceding stage to a succeeding stage, each unit circuit including a transistor that is connected from said input node directly to said output node of said each unit circuit and that receives said scanning signal supplied to said input node of said each unit circuit from a previous stage, said transistor, when turned on, outputting said scanning signal received at said input node to said output node of said each unit circuit for supply to said pixel circuit and a next stage thereby transfer said scanning signal from the preceding stage to the succeeding stage, said transistors included in even and odd stages of said unit circuits having gate terminals thereof connected in common directly to a single phase clock signal, said transistors included in odd stages of said unit circuits being controlled to be turned on and off respectively by a first logic level and a second logic level of said single phase clock signal supplied in common directly to said gate terminals of said transistors, while said transistors included in even stages of said unit circuits being controlled to be turned off and on respectively by said first logic level and said second logic level of said single phase clock signal supplied in common directly to said gate terminals of said transistors, wherein said TFT surface display device has a nonrectangular outer shape providing a non-rectangular display region, said display element units arranged in a nonrectangular area corresponding to said non-rectangular outer shape, and wherein said transistor in said unit circuit and said pixel circuit connected to said output node of said unit circuit are arranged in one-to-one correspondence within said display element unit as a set to constitute one of said display element units, and a plurality of said sets of said transistors and said pixel circuits are arrayed together to form substantially an entire area of a display area.

2. The TFT surface display device according to claim 1, wherein transistors in said unit circuit and transistors in said pixel circuits include polysilicon TFTs formed on a glass substrate to constitute an active matrix liquid crystal display device.

3. The TFT surface display device according to claim 1, wherein said unit circuit is arranged on said display substrate with one or more folded parts for forming a non-rectangular display area.

4. The TFT surface display device according to claim 1, wherein said unit circuit is arranged spirally on said display substrate to form a non-rectangular display area.

5. The TFT surface display device according to claim 1, wherein a part of said unit circuit is arranged between neighboring ones of said pixel circuits or underneath said pixel circuit.

6. The TFT surface display device according to claim 1, wherein a circuit including said pixel circuits and said unit circuit is arranged on said display substrate so as to have at least one bend.

7. The TFT surface display device according to claim 1, wherein a spirally extending array of said pixel circuits and said unit circuit is arranged on said display substrate.

8. The TFT surface display device according to claim 1, wherein a flexible linear display unit including said pixel circuits and said unit circuit that are linearly arranged is wrapped at least two turns on a support.

9. The TFT surface display device according to claim 1, wherein said pixel circuit includes a display element and a pixel switch that on/off controls a connection between a data signal and said display element responsive to said scanning signal from said unit circuit associated therewith.

10. An electronic device including the TFT surface display device as set forth in claim 1.

11. An ornamental product including the TFT surface display device as set forth in claim 1.

12. The TFT surface display device according to claim 1, wherein each of said pixel circuits arranged in each of said display element units includes a display element, and a pixel switch that on/off controls a connection between a data signal and said display element responsive to a scanning signal applied thereto from said output node of said unit circuit, to which said pixel circuit is connected, wherein said pixel switch is formed of one or more transistors of single polarity for each of said pixel circuits, wherein each said pixel switch includes a transistor having a gate electrode connected to an associated output node of said unit circuit, having a drain electrode connected to said data signal, and having a source electrode connected to said display element, wherein output nodes of odd stage unit circuits output a scanning signal of a first polarity, wherein output nodes of even stage unit circuits output a scanning signal of a second polarity opposite to said first polarity, wherein said transistors constituting said pixel switches connected to said output nodes of odd stage unit circuits are each of a first conductivity type, and wherein said transistors constituting said pixel switches connected to said output nodes of even stage unit circuits are each of a second conductivity type.

13. The display device according to claim 12, wherein said odd stage unit circuits each include:

an inverter circuit that receives a pulse signal supplied from a previous stage, and a switching transistor of said second conductivity type connected between an output node of said inverter circuit and an output node of said unit circuit, wherein said even stage unit circuits each include:

an inverter circuit that receives a pulse signal supplied from a previous stage, and a switching transistor of said first conductivity type connected between an output node of said inverter circuit and said output node of said unit circuit, and wherein a common clock signal is applied to gate electrodes of said switching transistors of said unit circuits of said odd and even stages.

14. The display device according to claim 12, wherein said odd stage unit circuits and said even stage unit circuits each include a clocked inverter that receives a pulse signal supplied from a previous stage, an output node of said clocked inverter being an output node of said unit circuit, wherein a clock signal is supplied to said gate electrode of said transistor of said second conductivity type of said clocked inverter in said odd stage unit circuit, and a signal obtained by inverting said clock signal is supplied to said gate electrode of said transistor of said first conductivity type of said clocked inverter, and wherein a signal obtained by inverting said clock signal is supplied to said gate electrode of said transistor of said second conductivity type of said clocked inverter in said even stage unit circuit, and said clock signal is supplied to said gate electrode of said transistor of said first conductivity type of said clocked inverter.

15. The display device according to claim 12,
wherein said odd stage unit circuits and said even stage unit circuits each include:
an inverter circuit that receives a pulse signal from a previous stage, and
a CMOS transmission gate connected between an output node of said inverter circuit and an output node of said unit circuit,
wherein a clock signal is supplied to said gate electrode of said transistor of said second conductivity type of said CMOS transmission gate in said odd stage unit circuit, and a signal obtained by inverting said clock signal is supplied to said gate electrode of said transistor of said first conductivity type of said CMOS transmission gate, and
wherein a signal obtained by inverting said clock signal is supplied to said gate electrode of said transistor of said second conductivity type of said CMOS transmission gate in said even stage unit circuit, and said clock signal is supplied to said gate electrode of said transistor of said first conductivity type of said CMOS transmission gate.

16. The display device according to claim 12,
wherein said even stage unit circuits and said odd stage unit circuits each include a single-phase clock controlled inverter comprising first to fourth switch devices, sequentially connected in series between a high potential side power supply and a low potential side power supply,
wherein said first and second switch devices are each a p-type MOS transistor,
wherein said third and fourth switch devices are each an n-type MOS transistor,
wherein gate electrodes of one of said p-type MOS transistors and one of said n-type MOS transistors being connected in common and receiving a pulse signal supplied from a previous stage, while a clock signal is supplied to gates of remaining two MOS transistors, and
wherein drain electrodes of said one of said p-type MOS transistors and said one of said n-type MOS transistors being connected in common to constitute said output node of said unit circuit.

17. The TFT display device according to claim 1,
wherein a plurality of stages of said unit circuits of said display elements are stringed together to form a scanning circuit, said unit circuits each receiving a scanning signal from either of an input terminal or a previous stage, and outputting said scanning signal from an output node thereof responsive to an input clock signal wherein
said pixel circuits of said plurality of display element units are arranged in association with said unit circuits of said scanning circuit, and
wherein each pixel circuit of said display element units includes a pixel switch that is on/off controlled responsive to said scanning signal output from an associated unit circuit of said scanning circuit, a data signal being written to an associated display element unit when said pixel switch is on.

* * * * *